United States Patent
Mahmood et al.

(10) Patent No.: US 10,802,749 B2
(45) Date of Patent: Oct. 13, 2020

(54) IMPLEMENTING HIERARCHICAL AVAILABILITY DOMAIN AWARE REPLICATION POLICIES

(71) Applicant: Nutanix, Inc., San Jose, CA (US)

(72) Inventors: Mohammad Mahmood, Bangalore (IN); Anoop Menon, Bangalore (IN); Ashwin Thennaram Vakkayil, Malappuram (IN); Sandeep Kumar Madanala, Hyderabad (IN); Shubham Shukla, Bangalore (IN); Chern Yih Cheah, Seattle, WA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/425,022

(22) Filed: May 29, 2019

(65) Prior Publication Data

US 2019/0278483 A1   Sep. 12, 2019

Related U.S. Application Data

(63) Continuation-in-part of application No. 15/230,147, filed on Aug. 5, 2016.

(51) Int. Cl.
   *G06F 3/06*   (2006.01)
(52) U.S. Cl.
   CPC ............. *G06F 3/065* (2013.01); *G06F 3/067* (2013.01); *G06F 3/0619* (2013.01)
(58) Field of Classification Search
   None
   See application file for complete search history.

(56) References Cited

U.S. PATENT DOCUMENTS

| | | | |
|---|---|---|---|
| 6,487,562 B1 | 11/2002 | Mason, Jr. et al. | |
| 6,571,314 B1 | 5/2003 | Komachiya et al. | |
| 7,320,088 B1 | 1/2008 | Gawali | |
| 7,738,466 B2 * | 6/2010 | Schwan | H04L 67/104 370/395.32 |
| 8,549,518 B1 | 10/2013 | Aron et al. | |
| 8,601,473 B1 | 12/2013 | Aron et al. | |
| 8,850,130 B1 | 9/2014 | Aron et al. | |
| 8,966,027 B1 | 2/2015 | Brandwine et al. | |

(Continued)

OTHER PUBLICATIONS

Wikipedia, "Replication (computing)", Mar. 28, 2016, 8 pages.

(Continued)

*Primary Examiner* — Anh Vu H Ly
(74) *Attorney, Agent, or Firm* — Vista IP Law Group, LLP

(57) ABSTRACT

A method commences upon accessing a set of data items that describe computing nodes to be organized into failure-tolerant configuration. The failure-tolerant configuration is characterized by system availability characteristics such as a replication factor and such as a hierarchical distribution of computing nodes. Characteristics of the topology include boundaries that define two or more hierarchically-related availability domain levels. Computing nodes are situated within these boundaries. Instances of a target hierarchical availability domain level are sorted, and instances of a hierarchically lower availability domain level are also sorted to form a multi-level sort order of computing nodes. Computing entities are mapped onto the computing nodes by observing the multi-level sort order.

20 Claims, 23 Drawing Sheets

(56) References Cited

U.S. PATENT DOCUMENTS

| | | |
|---|---|---|
| 8,997,097 B1 | 3/2015 | Aron et al. |
| 9,052,936 B1 | 6/2015 | Aron et al. |
| 9,256,374 B1 | 2/2016 | Aron et al. |
| 9,256,475 B1 | 2/2016 | Aron et al. |
| 9,354,912 B1 | 5/2016 | Aron et al. |
| 9,389,887 B1 | 7/2016 | Aron et al. |
| 9,575,784 B1 | 2/2017 | Aron et al. |
| 9,619,257 B1 | 4/2017 | Aron et al. |
| 9,635,109 B2 | 4/2017 | Iliadis et al. |
| 9,772,784 B2 | 9/2017 | Bhardwaj et al. |
| 9,772,866 B1 | 9/2017 | Aron et al. |
| 9,817,606 B1 | 11/2017 | Byrne et al. |
| 10,489,215 B1* | 11/2019 | Wen .............. H04L 41/0896 |
| 2003/0204509 A1 | 10/2003 | Dinker et al. |
| 2004/0066741 A1* | 4/2004 | Dinker .............. G06F 11/1662 370/216 |
| 2005/0015641 A1 | 1/2005 | Alur et al. |
| 2007/0006015 A1 | 1/2007 | Rao et al. |
| 2007/0094343 A1 | 4/2007 | Sangle et al. |
| 2007/0150558 A1* | 6/2007 | Teodosiu .............. H04L 67/104 709/220 |
| 2007/0226224 A1 | 9/2007 | Wanigasekara-Mohotti et al. |
| 2009/0077557 A1 | 3/2009 | Ichikawa et al. |
| 2010/0003681 A1 | 1/2010 | Azuma et al. |
| 2011/0231450 A1* | 9/2011 | Sinha .............. G06F 16/256 707/802 |
| 2013/0163471 A1* | 6/2013 | Indukuri .............. G06Q 10/00 370/255 |
| 2014/0075002 A1* | 3/2014 | Pradhan .............. H04L 67/306 709/223 |
| 2016/0191391 A1* | 6/2016 | Wood .............. H04L 45/50 370/235 |
| 2016/0232061 A1 | 8/2016 | Gaschler et al. |
| 2017/0013058 A1 | 1/2017 | Annamalai et al. |
| 2017/0132089 A1 | 5/2017 | Roehrsheim et al. |
| 2017/0147227 A1* | 5/2017 | Stabrawa .............. G06F 3/0607 |
| 2017/0317780 A1* | 11/2017 | Wood .............. H04L 41/12 |
| 2018/0121295 A1 | 5/2018 | Ramamurthi et al. |
| 2019/0155613 A1* | 5/2019 | Olderdissen .............. G06F 9/45558 |
| 2019/0322495 A1* | 10/2019 | Prager .............. B66F 19/00 |
| 2020/0019514 A1* | 1/2020 | Desai .............. G06F 12/0815 |
| 2020/0026446 A1* | 1/2020 | Jawahar .............. G06F 3/065 |
| 2020/0034257 A1* | 1/2020 | Mahmood .............. G06F 3/0619 |

OTHER PUBLICATIONS

Featherston, D., "Cassandra: Principles and Application", University of Illinois at Urbana-Champaign, May 2010, 17 pages.

Lakshman et al., "Cassandra—A Decentralized Structured Storage System", Jan. 2008, 6 pages.

Ex-Parte Quayle Action dated Mar. 28, 2018 for related U.S. Appl. No. 15/230,147.

Notice of Allowance dated Aug. 3, 2018 for related U.S. Appl. No. 15/230,147, 5 pages.

Notice of Allowance dated Mar. 25, 2019 for related U.S. Appl. No. 15/230,147, 7 pages.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Vpsa Object Storage: "Introduction" (Jun. 6, 2019), Zadara Guides, Version: 18.07, from http://guides.zadarastorage.com/zios-guide/1807/introduction.html.

Openstack: "The Rings" (Updated on Jun. 3, 2019), from https://docs.openstack.org/swift/latest/overview_ring.html.

Mills, A. "Algorithms for Optimal Replica Placement Under Correlated Failure in Hierarchical Failure Domains" (Apr. 21, 2017), The University of Texas at Dallas.

Rbiswas. "Rack Awareness—Hortonworks" (Jul. 2, 2016), from https://community.hortonworks.com/articles/43057/rack-awareness-1.html.

"Virtuozzo Storage: Administrator's Command Line Guide" (Apr. 24, 2019), https://docs.virtuozzo.com/pdf/virtuozzo_storage_administrators_command_line_guide.pdf.

Non-Final Office Action dated Jul. 8, 2019 for related U.S. Appl. No. 15/230,147.

Notice of Allowance dated Aug. 27, 2019 for related U.S. Appl. No. 15/818,660.

Cano, I. et al., "Curator: Self-Managing Storage for Enterprise Clusters", 14th USENIX Symposium on Networked Systems Design and Implementation, NSDI '17, (Mar. 27, 2017).

Final Office Action dated Nov. 20, 2019 for related U.S. Appl. No. 15/230,147.

Notice of Allowance dated Jan. 31, 2020 for related U.S. Appl. No. 15/818,660.

Notice of Allowance dated Feb. 26, 2020 for related U.S. Appl. No. 15/230,147.

* cited by examiner

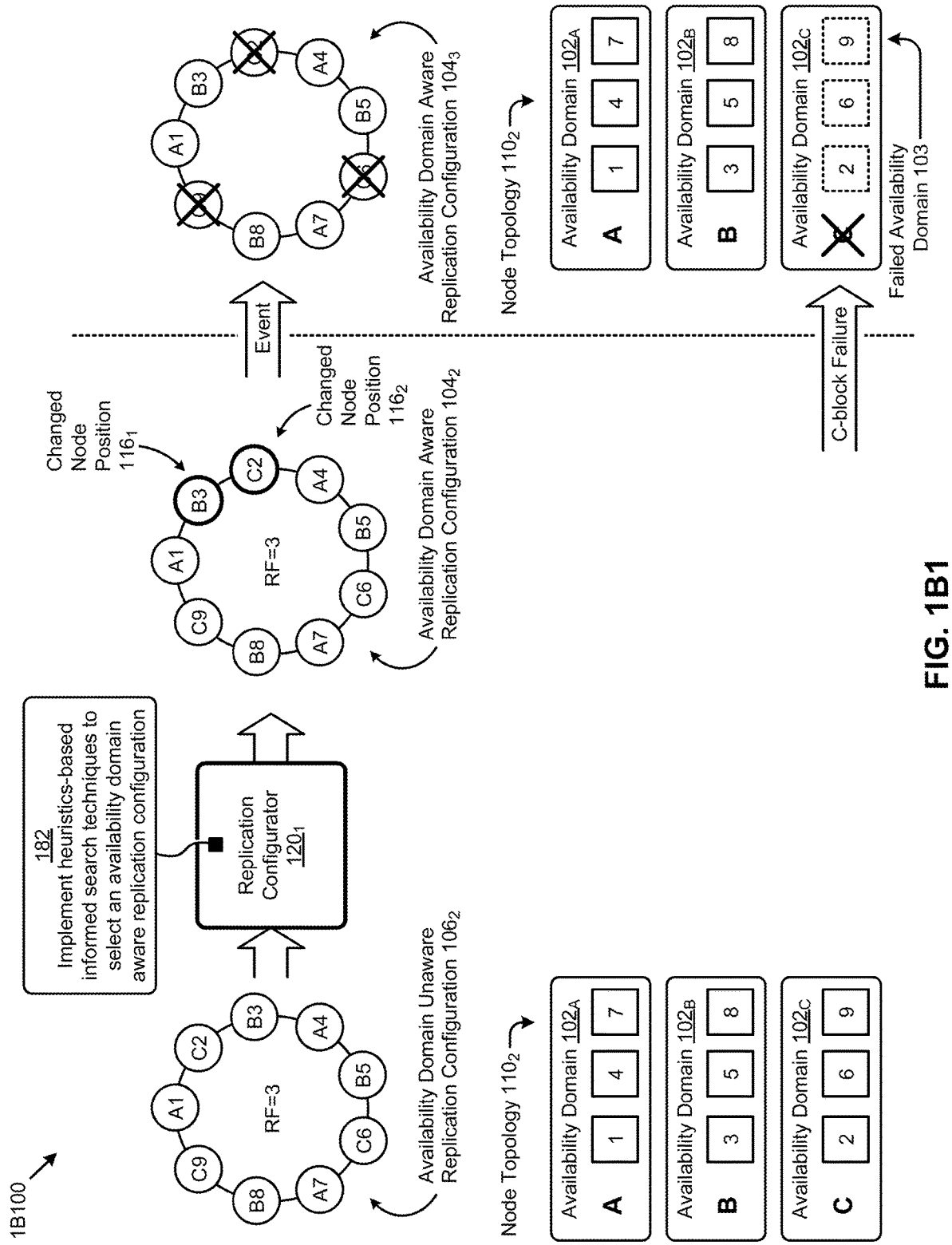
FIG. 1B1

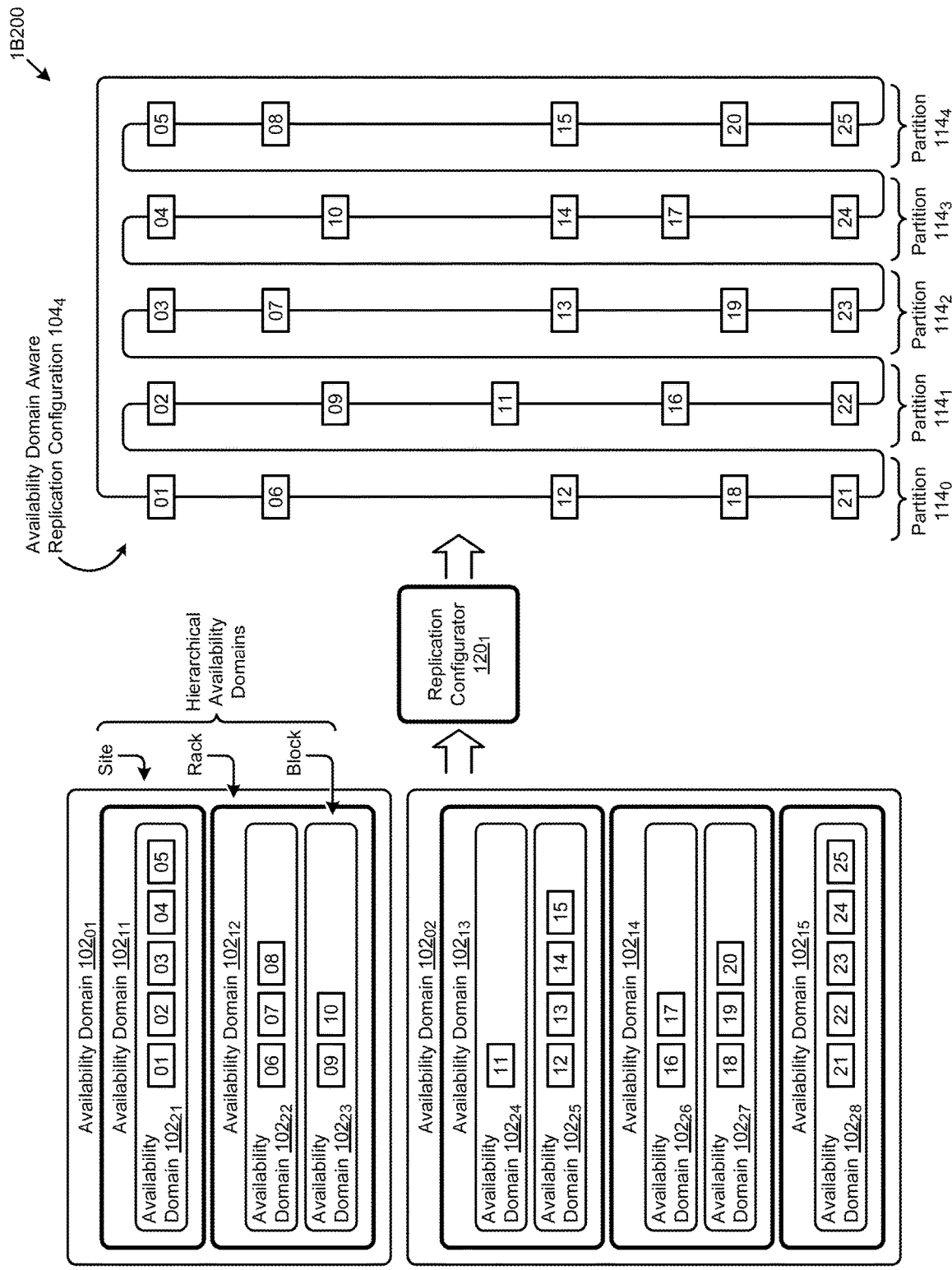
FIG. 1B2

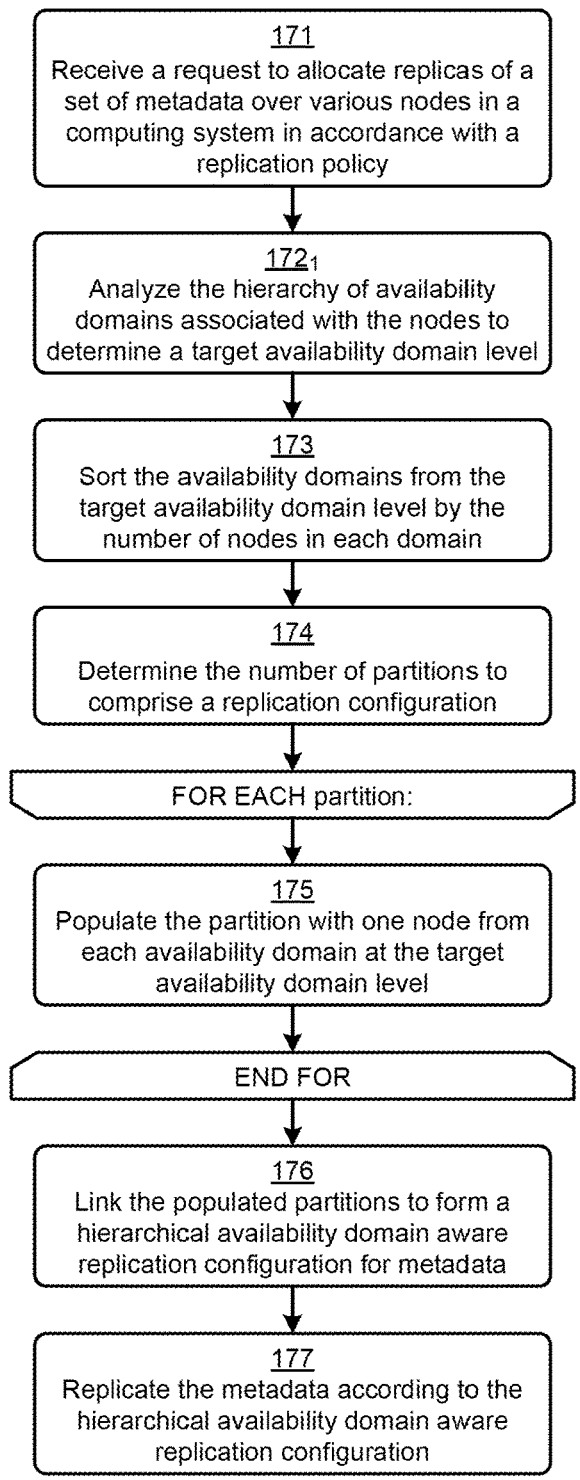
FIG. 1B3

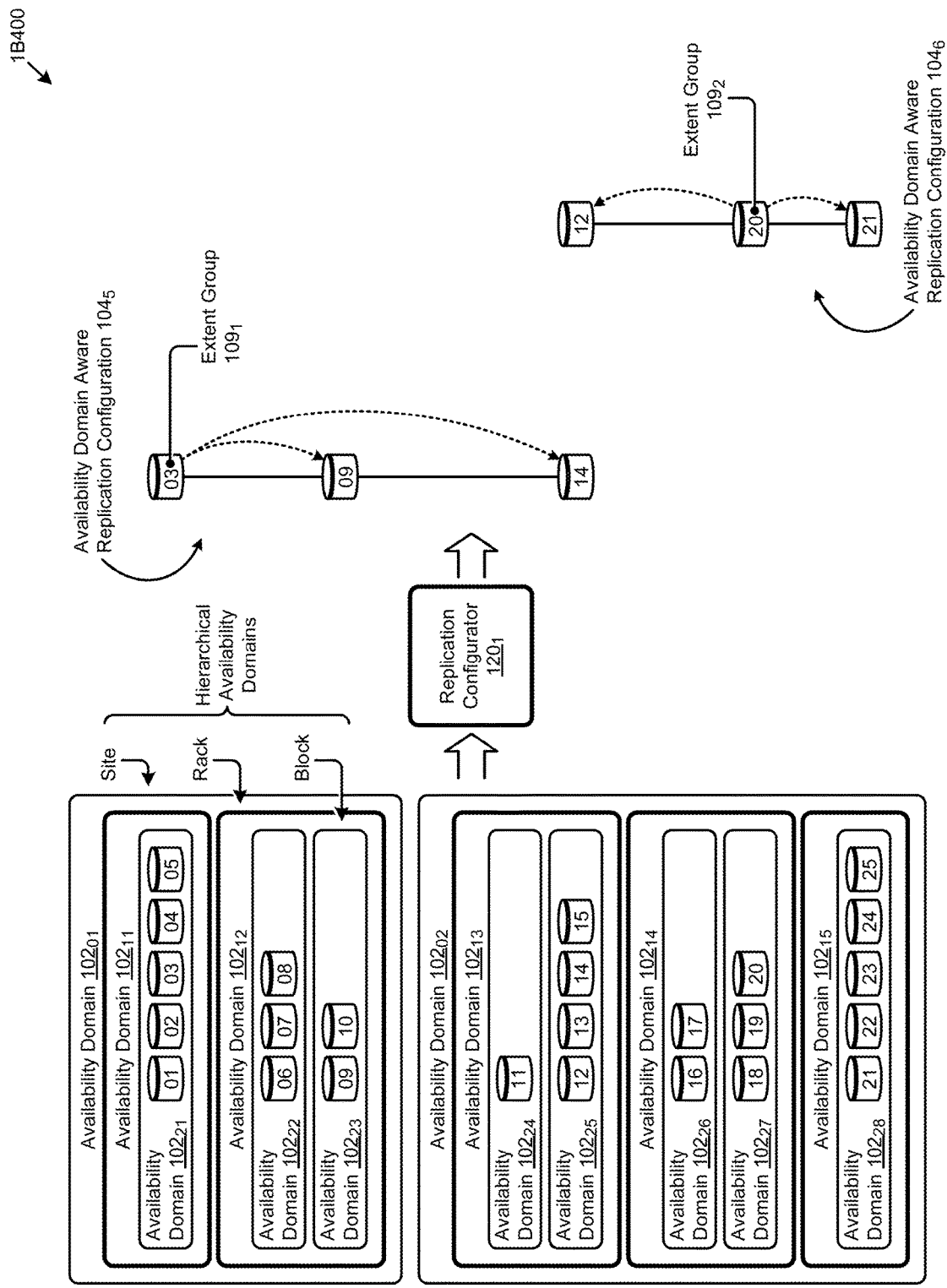
FIG. 1B4

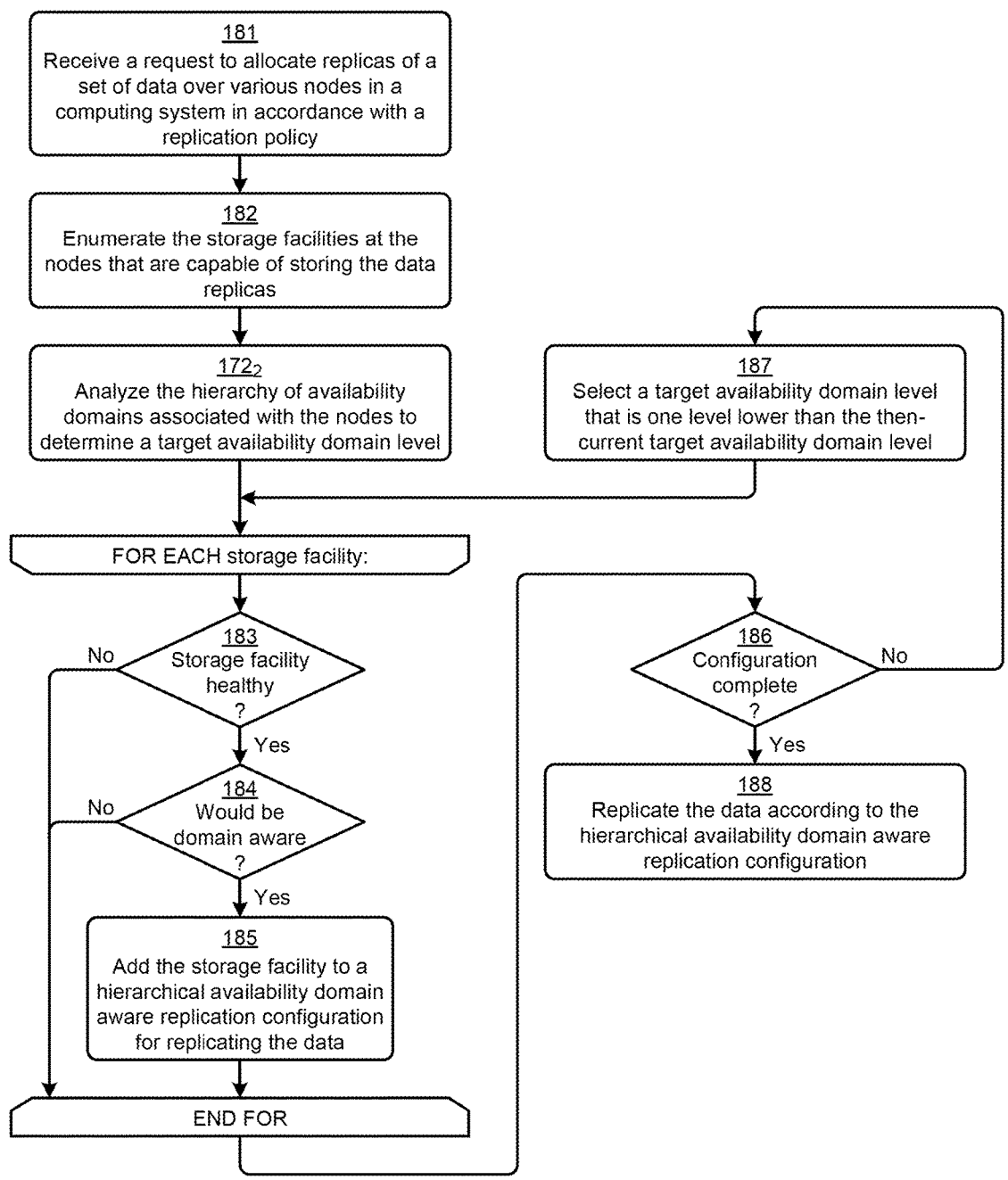
FIG. 1B5

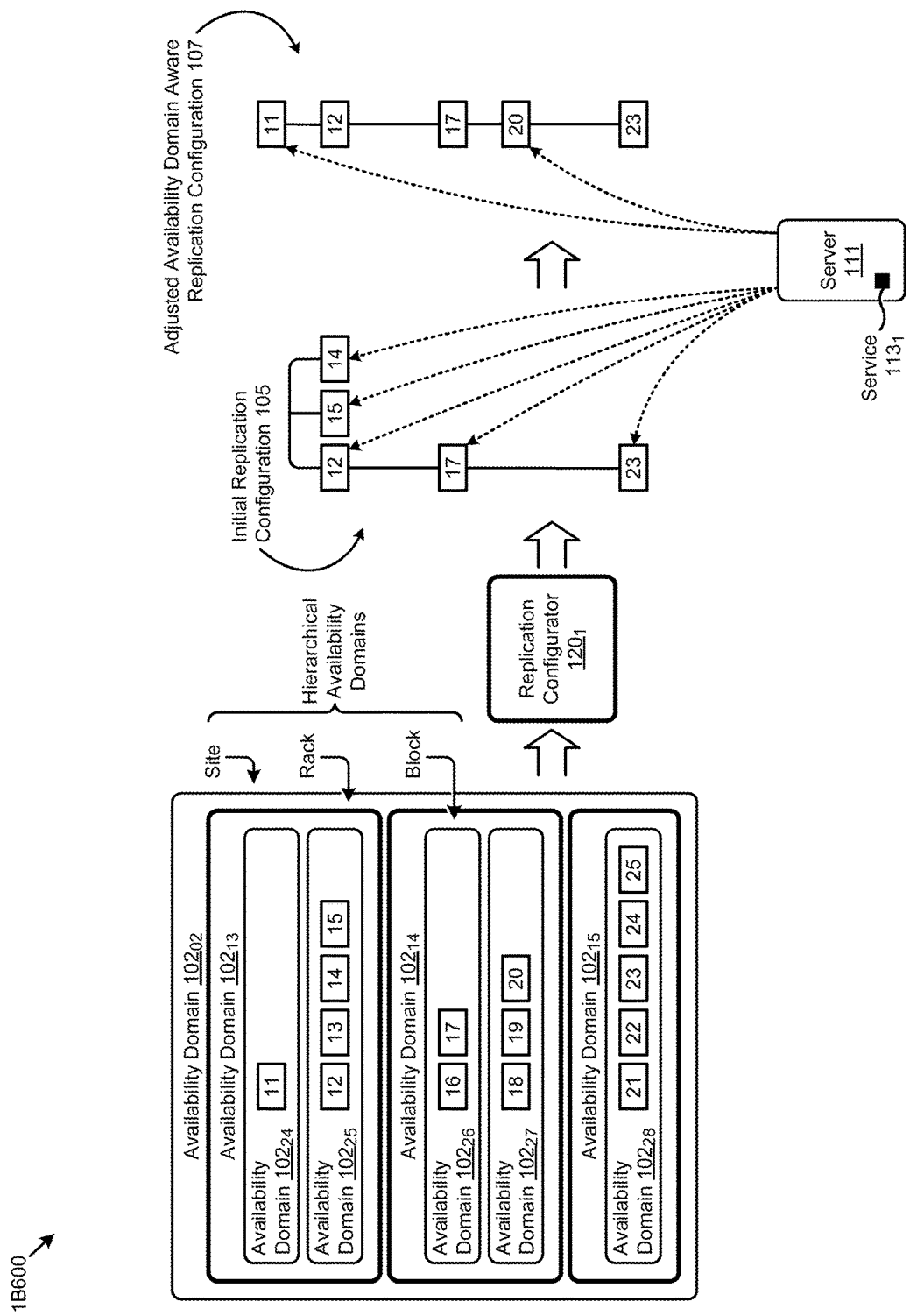
FIG. 1B6

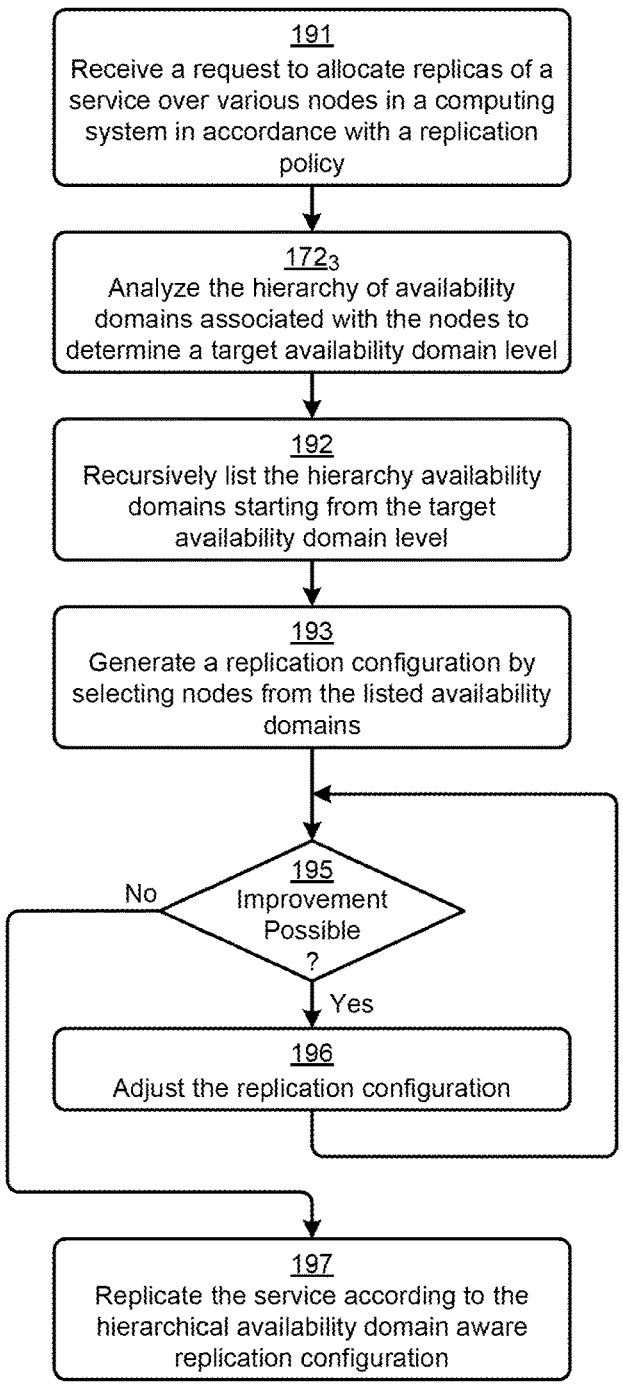
FIG. 1B7

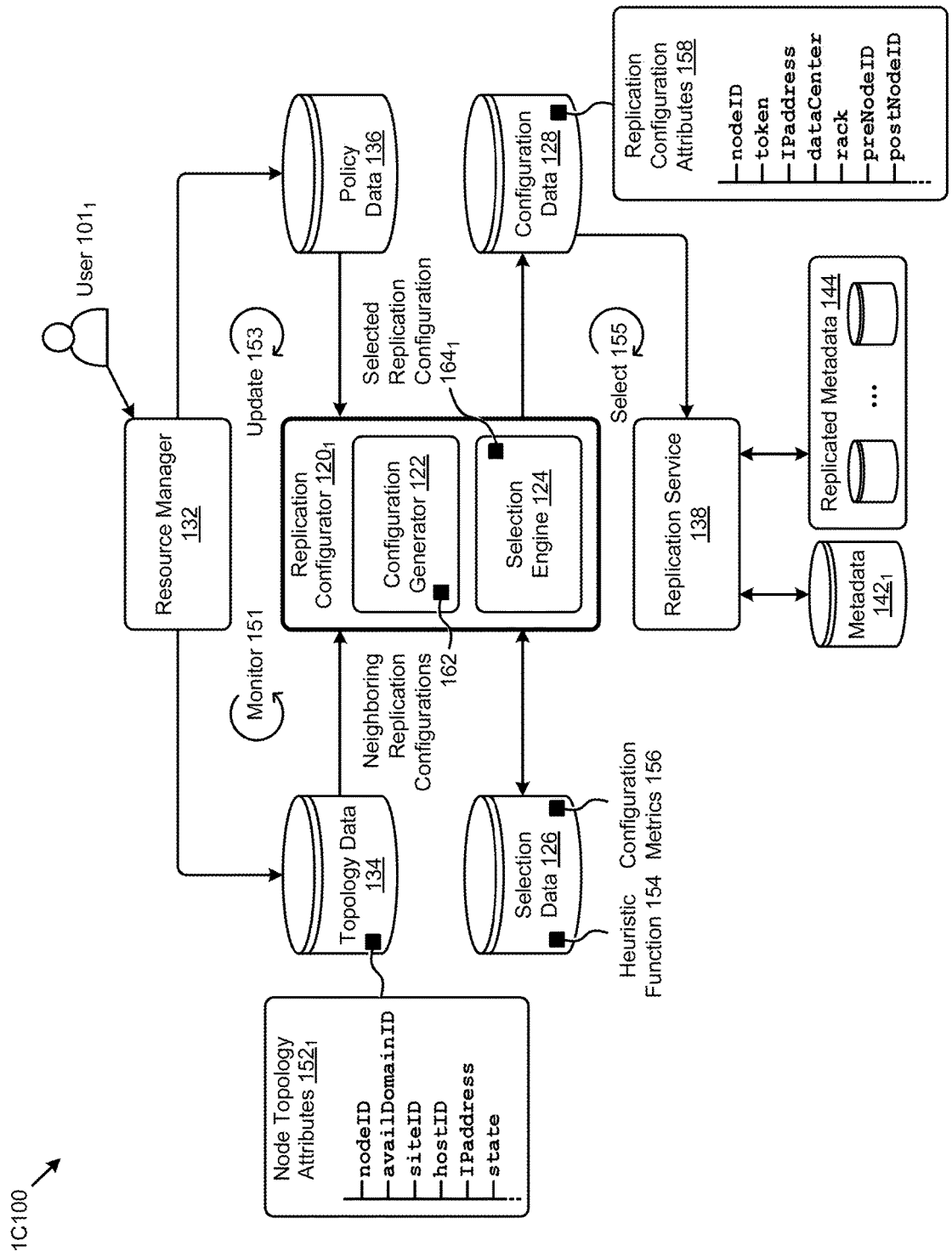
FIG. 1C1

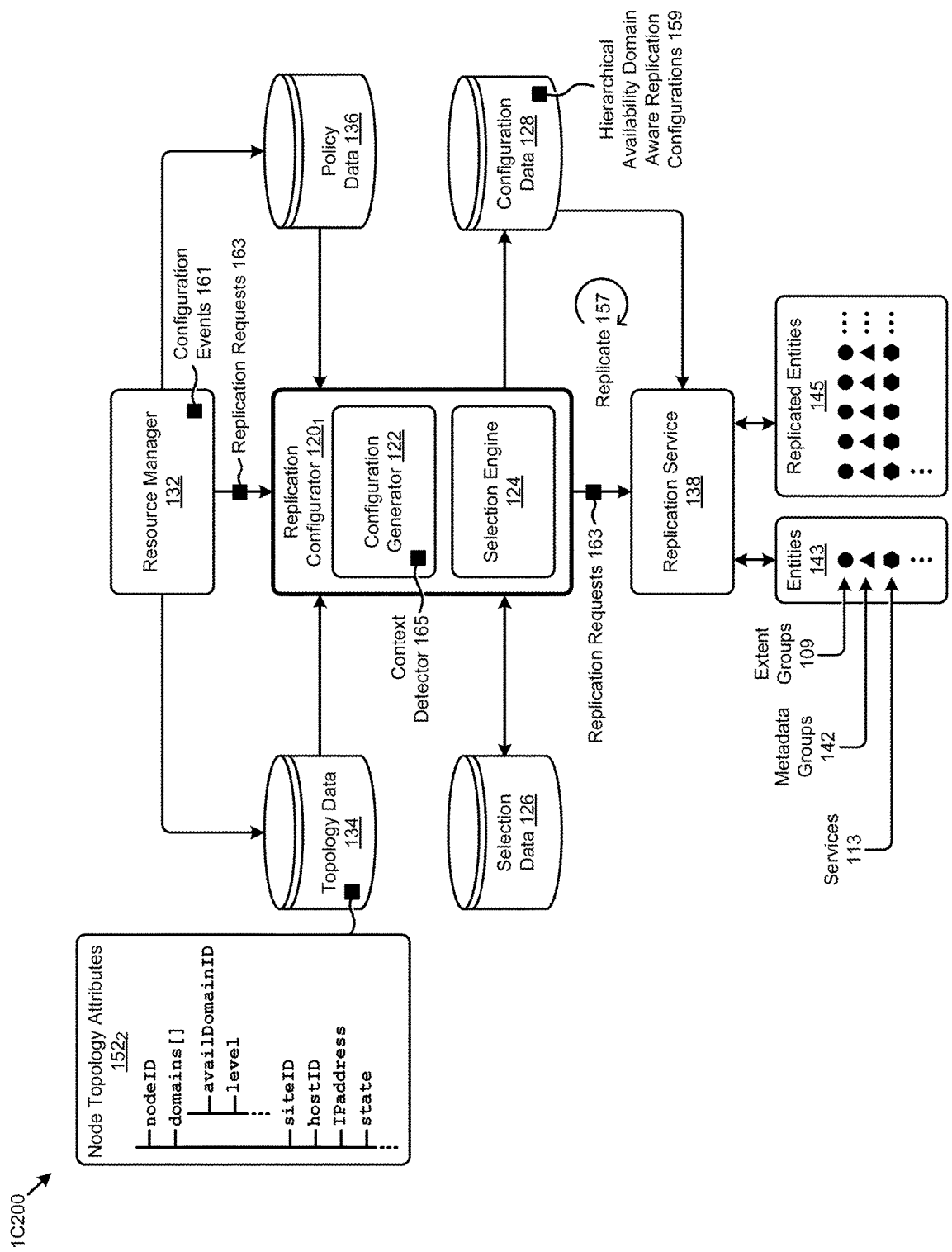
FIG. 1C2

IMPLEMENTING HIERARCHICAL AVAILABILITY DOMAIN AWARE REPLICATION POLICIES

RELATED APPLICATIONS

The present application is a continuation-in-part of, and claims the benefit of priority to co-pending U.S. patent application Ser. No. 15/230,147 titled "IMPLEMENTING AVAILABILITY DOMAIN AWARE REPLICATION POLICIES", filed on Aug. 5, 2016, which is hereby incorporated by reference in its entirety.

FIELD

This disclosure relates to clustered computing systems, and more particularly to techniques for efficiently implementing replication policies that derive from analysis of hierarchical availability domain topologies.

BACKGROUND

The use of virtual machines (VMs) and other virtualized entities (VEs) to improve the use of computing resources continues to increase. Such VMs can be characterized as software-based computing "machines" implemented in a virtualization environment comprising various hardware resources (e.g., CPU, memory, etc.). The VMs can operate based at least in part on the computer architecture and/or functions (e.g., operating system) of a real or hypothetical computer. Multiple VMs can operate on one physical machine (e.g., computing node), with each VM sharing the resources of that physical node. The various VMs can be configured to run multiple respective operating systems and/or multiple applications and/or workloads on the node. Such configurability can be facilitated at least in part by a hypervisor, which hypervisor allocates hardware resources dynamically and transparently.

The high storage I/O demand of VMs and/or other VEs (e.g., executable containers) has precipitated an increase in distributed storage systems implemented in the virtualization environments. Specifically, such "hyperconverged" distributed computing systems can aggregate various physical storage facilities to create a logical storage pool throughout which certain data may be efficiently distributed according to various metrics and/or objectives. For example, a set of logically contiguous data called a virtual disk (vDisk) might be stored as extent groups distributed over various physical storage facilities. Metadata describing the storage pool and/or its virtualized representations (e.g., vDisks) may be also distributed any number of times among various nodes in the hyperconverged distributed computing system. Furthermore, data objects that describe the configuration of the virtualized entities (e.g., VMs, vDisks, etc.) and/or the physical entities (e.g., clusters, sites, racks, nodes, etc.) of a hyperconverged distributed computing system are also managed by the system.

Users of hyperconverged distributed computing systems have a data consistency expectation (e.g., "strictly consistent") of such systems to provide consistent and predictable behavior (e.g., availability, accuracy, etc.) of data, metadata, configuration data, and/or other system components (e.g., services, etc.) in the presence of certain faults (e.g., node failure) that might occur at the systems. Such consistency expectations can be addressed by implementing a replication policy to facilitate data and/or service redundancy and/or availability in case of a failure at a node and/or other computing resource. For example, a given replication policy might be described at least in part by a numeric replication factor (RF) such as "RF=3", indicating that three replicas of certain entities (e.g., metadata, user data, configuration data, configuration services, servers, applications, agents, etc.) are to be distributed over various available nodes in the system. If a failure occurs at one of the nodes, the replicated entities at other nodes can be accessed to achieve the availability objective associated with the replication policy.

Unfortunately, legacy techniques for implementing replication policies in hyperconverged distributed computing systems can be limited at least in their ability to be aware of availability domains. A replication policy implementation that is availability domain aware is one that remains compliant upon failure at any one availability domain, which availability domain might be defined by a boundary that includes a certain set of physical and/or virtual components (e.g., one or more nodes, blocks, hosts, sites, appliances, racks, data centers, etc.). If the replication policy is violated upon failure of one or more components in the availability domain, the implementation becomes availability domain unaware. For example, if an RF of three (e.g., RF=3) is specified for a given replication policy and failure of one or more components in an availability domain results in two of the three replication nodes to fail, the replication policy will be violated.

Some legacy replication policy implementation techniques, for example, might facilitate selecting the replication nodes randomly or in a manner that is unaware or agnostic to availability domain associations. In such cases, various availability domain failures can precipitate replication policy violations. The frequency of such violations increase as the number of nodes and/or the RF increases. Other legacy techniques might decrease the RF in the replication policy at the risk of data inconsistency and/or data loss. In some cases, more availability domains (e.g., more hardware appliances, more hosts, more racks, more sites, more data centers, etc.) might be added to reduce the likelihood of replication policy violations. However, such techniques impose significant hardware expenses, facility expenses, and/or implementation expenses. Furthermore, legacy replication policy implementation techniques may not be aware of or otherwise accommodate the hierarchical relationships of availability domains. The number of hierarchical relationships between availability domains increases as the subject system gets larger and larger, and/or as the subject system is populated with more and more rackable units and as the subject system is populated with more and more racks. As an example, selection of replication nodes according to such techniques may not produce a desired degree of fault tolerance with respect to both the rackable unit availability domains as well as for rack-level availability domains. Legacy approaches also do not accommodate the many contexts (e.g., subsystems) of modern hyperconverged distributed computing systems that have a variety of entities (e.g., user data, metadata, configuration data, configuration services, servers, applications, agents, etc.) that are to be replicated in an availability domain aware manner. For highly scalable and active hyperconverged distributed computing systems having hierarchical availability domains and multiple types of protected data and/or services, the foregoing legacy techniques are deficient.

What is needed is a technique or techniques to improve over legacy and/or over other considered approaches.

SUMMARY

The present disclosure describes techniques used in systems, methods, and in computer program products for implementing hierarchical availability domain aware replication policies, which techniques advance the relevant technologies to address technological issues with legacy approaches. More specifically, the present disclosure describes techniques used in systems, methods, and in computer program products for implementing hierarchical availability domain aware replication policies in hyperconverged distributed computing environments. Certain embodiments are directed to technological solutions for applying context-based node selection techniques over hierarchical availability domains to form availability domain aware replication configurations.

The disclosed embodiments modify and improve over legacy approaches. In particular, the herein-disclosed techniques provide technical solutions that address the technical problems attendant to implementing replication policies that apply to multiple types of data and/or services and observe hierarchical availability domain boundaries. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demands for computer memory, reduce demands for computer processing power, reduce network bandwidth usage, and reduce demands for intercomponent communication.

For example, when performing computer operations that address the various technical problems underlying implementing replication policies that apply to multiple types of data and/or services and observe hierarchical availability domain boundaries, both memory usage and CPU cycles demanded are significantly reduced as compared to the memory usage and CPU cycles that would be needed but for practice of the herein-disclosed techniques for applying context-based node selection techniques over hierarchical availability domains to form availability domain aware replication configurations. Strictly as one case, the data structures as disclosed herein, and their use as further as disclosed herein serve to reduce both memory usage and CPU cycles as compared to alternative approaches. Specifically, practice of the herein disclosed techniques reduces or eliminates the consumption of compute resources, storage resources, networking resources, and/or other resources to recover from failures. Such reduction or elimination of wasteful computing resource uses arises as a result of generating and using availability domain aware replication configurations that observe hierarchical availability domains.

Many of the herein-disclosed embodiments for applying context-based node selection techniques over hierarchical availability domains to form availability domain aware replication configurations are technological solutions pertaining to technological problems that arise in the hardware and software arts that underlie hyperconverged distributed computing environments.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 1B1 illustrates an availability domain aware replication scenario facilitated by systems that efficiently implement availability domain aware replication policies in distributed storage platforms, according to an embodiment.

FIG. 1B2 depicts a metadata replication configuration generation scenario as exhibited by systems that facilitate implementing hierarchical availability domain aware replication policies in hyperconverged distributed computing environments, according to an embodiment.

FIG. 1B3 presents a metadata replication technique as applied in systems that facilitate implementing hierarchical availability domain aware replication policies in hyperconverged distributed computing environments, according to an embodiment.

FIG. 1B4 depicts a data replication configuration generation scenario as exhibited by systems that facilitate implementing hierarchical availability domain aware replication policies in hyperconverged distributed computing environments, according to an embodiment.

FIG. 1B5 presents a data replication node selection technique as applied in systems that facilitate implementing hierarchical availability domain aware replication policies in hyperconverged distributed computing environments, according to an embodiment.

FIG. 1B6 depicts a service replication configuration generation scenario as exhibited by systems that facilitate implementing hierarchical availability domain aware replication policies in hyperconverged distributed computing environments, according to an embodiment.

FIG. 1B7 presents a service replication node selection technique as applied in systems that facilitate implementing hierarchical availability domain aware replication policies in hyperconverged distributed computing environments, according to an embodiment.

FIG. 1C1 depicts implementation techniques as used when implementing availability domain aware replication policies in distributed storage platforms, according to an embodiment.

FIG. 1C2 is a block diagram of a system that implements hierarchical availability domain aware replication policies in hyperconverged distributed computing environments, according to an embodiment.

DETAILED DESCRIPTION

Figure 1A:
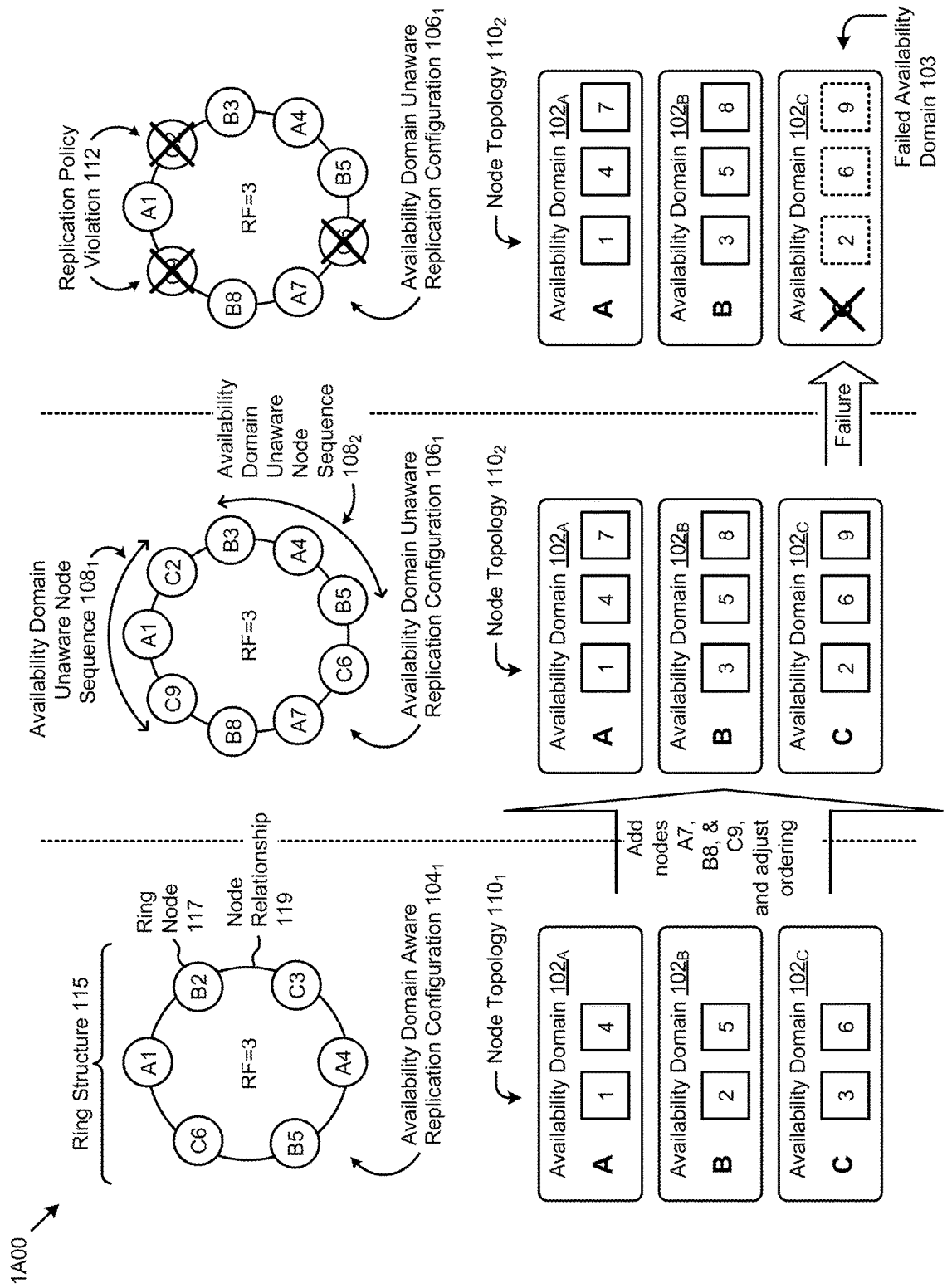
FIG. 1A illustrates an availability domain unaware replication scenario.

Aspects of the present disclosure solve problems associated with implementing replication policies that apply to multiple types of data and/or services that operate within hierarchical availability domain boundaries. These problems are unique to computerized methods for implementing replication policies in the context of hyperconverged distributed computing systems. Some embodiments are directed to approaches for applying context-based node selection techniques over hierarchical availability domains to form and evaluate availability domain aware replication configurations. The accompanying figures and discussions herein present example environments, systems, methods, and computer program products for implementing hierarchical availability domain aware replication policies in hyperconverged distributed computing environments.

Overview

Disclosed herein are techniques for applying context-based node selection techniques over hierarchical availability domains to form and evaluate domain aware replication configurations. In certain embodiments, one or more instances of a replication configurator operates within a hyperconverged distributed computing system. The replication configurator receives requests to form availability domain aware replication configurations. The replication configurator observes a given replication factor. Computing entities of the system such as data entities (e.g., extent groups, portions of extent groups, etc.), metadata entities, configuration data, configuration services, applications, agents, and/or other entities, are replicated to provide certain fault tolerances (e.g., as may be specified in a replication policy) throughout respective subsystems of the hyperconverged distributed computing system. The replication configurations and corresponding policies define how the replicas of the entities are distributed over the system.

For example, a replication configuration or replication policy might define the specific nodes and associated availability domains that are to store particular entity replicas. The techniques for forming candidate replication configurations are based at least in part on the context (e.g., replication entity, target hierarchical availability domain level, policy, etc.) of the requests.

Specifically, when a request to form candidate replication configurations is received, the various hierarchical levels of availability domains of the system are analyzed to determine the highest-level availability domain boundary of the system (e.g., to the level of rackable units, or to the level of racks, or to the level of a data center, etc.). A context-based node selection technique is applied at highest-level availability domain level to generate at least one candidate replication configuration. If no candidate replication configuration is discovered that is availability domain aware at the then-current availability domain level, an availability domain level that is hierarchically one level lower than the then-current target hierarchical availability domain level is selected, and candidate replication configurations are generated in accordance with the new target availability domain level. If no candidate replication configuration is discovered that is availability domain aware at the new target availability domain level, an availability domain level that is still one more level lower than the then-current target availability domain level is selected, and so on.

The foregoing configuration generation and level adjustment operations are repeated until an availability domain aware replication configuration is discovered. In certain embodiments, certain quantitative characteristics (e.g., a replication factor requirement, a configuration score, a node score, a maximum consecutive node score, a transition score, a block aware score, a rack aware score, a heuristic function, etc.) of the candidate replication configurations are used to select from among multiple availability domain aware replication configurations. In certain embodiments, the replication configuration requests are invoked in response to a configuration event (e.g., node topology change, node failure, storage facility failure, etc.).

Furthermore, techniques are disclosed herein for implementing a heuristics-based informed search technique to efficiently select an availability domain aware replication configuration. In certain embodiments, a replication configurator implemented in a distributed storage platform can monitor a current replication configuration to determine an availability domain aware status. If the current replication configuration is or has become availability domain unaware, the replication configurator can determine a set of possible replication configurations for the given environment. In some embodiments, some of the possible replication configurations can be constrained. For example, some of the possible replication configurations comprising nodes in a ring arrangement might be constrained to only ring arrangements that exhibit only on node position change (e.g., in comparison to the current replication configuration). A transition score can be determined for the possible replication configurations to facilitate selection of an availability domain aware replication configuration. In certain embodiments, the transition score can be based at least in part on a heuristic function derived from certain metrics associated with the possible replication configurations. In other embodiments, the selection can be based at least in part on an informed search technique.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment. Specifically, a particular embodiment can be practiced in any environments and/or in conjunction with any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A illustrates an availability domain unaware replication scenario 1A00. As an option, one or more variations of availability domain unaware replication scenario 1A00 or any aspect thereof may be implemented in the context of the architecture and functionality of the embodiments described herein. The availability domain unaware replication scenario 1A00 or any aspect thereof may be implemented in any environment.

A node topology 1101 shown in FIG. 1A might comprise a hierarchical topology having three availability domains (e.g., availability domain $102_A$, availability domain $102_B$, and availability domain $102_C$) in a highly scalable distributed storage platform. An availability domain (e.g., a fault domain), can be a set of hardware components (e.g., computers, switches, etc.) that share a single point of failure. As an example, an availability domain might be bounded by a physical server or a rack of servers. In some cases, the availability domain might be a portion of a server rack, where merely certain support components (e.g., redundant power supply unit, fans, etc.) are shared with other availability domains comprising the server rack. Node topology 1101 further indicates various compute and/or storage nodes implemented in each availability domain.

Specifically, node 1 and node 4 are in availability domain $102_A$, node 2 and node 5 are in availability domain $102_B$, and node 3 and node 6 are in availability domain $102_C$. A replication policy for the data (e.g., metadata, user data, etc.) pertaining to the nodes comprising node topology 1101 might be implemented among the nodes using a replication configuration represented by a ring structure 115 as shown. Specifically, the ring structure 115 represents the node relationships (e.g., node relationship 119) among a set of ring nodes (e.g., ring node 117) from the nodes in node topology 1101. As shown, the ring nodes can be represented in notation by "[availability domain identified][node identifier]" (e.g., A1, B2, C3, etc.). A replication service can use the ring-like replication configuration to implement the replication policy. For a replication policy that includes an integer value that serves as a replication factor of three (e.g., RF=3), data replications for a subject ring node will be performed on the two ring nodes that are one position and two positions (e.g., traversing clockwise) from the subject ring node. For example, data from ring node A1 will be replicated on ring node B2 and ring node C3. In some cases, the direction that replicas are placed on the ring structure is based at least in part on an increasing token order.

In some cases, a majority of ring nodes (e.g., a quorum) related to a given replication are to agree on the consistency of the replicated data before the replication is committed. This ensures strict consistency for all stored data and/or metadata. The quorum number (e.g., QN) also establishes a minimum number of replication copies that need to be available at a given moment in time, such as after a node and/or availability domain failure. For example, a replication factor of three (e.g., RF=3) corresponds to a quorum number of two (e.g., QN=2), such that an availability domain failure can render merely one of the three copies unavailable. When the number of copies available after an availability domain failure is greater than or equal to the quorum number, the replication configuration is "availability domain aware". When the number of copies available after an availability domain failure is less than the quorum number, the replication configuration is "availability domain unaware". Of course, the arithmetic semantics pertaining to surpassing a threshold value (e.g., higher or lower) and/or corresponding comparison techniques (e.g., greater than or lower than) can be defined using any known technique.

As shown, the replication configuration for node topology 1101 shown in FIG. 1A is an availability domain aware replication configuration $104_1$. As further shown, certain system scaling operations might result in a modified instance of a node topology $110_2$. Specifically, three nodes (e.g., node 7, node 8, and node 9) might be added to the availability domains. It is possible that as newly-added nodes are included in the replication configuration, an availability domain unaware replication configuration $106_1$ might be generated. In this case, one or more availability domain unaware node sequences (e.g., availability domain unaware node sequences $108_1$ and availability domain unaware node sequences $108_2$) might be included in the ring structure. Such availability domain unaware node sequences comprise ring nodes from a given availability domain that are positioned such that a failure of in an availability domain would violate a replication policy. For example, ring node C9 and ring node C2 in availability domain unaware node sequences $108_1$, and ring node B3 and ring node B5 in the availability domain unaware node sequences $108_2$ can precipitate a replication policy violation (e.g., when RF=3) upon failure of availability domain 102c or availability domain $102_B$, respectively. As shown in FIG. 1A, when the availability domain 102c is the failed availability domain 103, ring node C2, ring node C6, and ring node C9 are rendered unavailable, resulting in a replication policy violation 112.

The herein disclosed techniques can address such issues attendant to implementing replication policies in highly scalable distributed storage platforms that observe availability domain boundaries. Such techniques are shown and described as pertains to FIG. 1B1.

FIG. 1B1 illustrates an availability domain aware replication scenario 1B100 facilitated by systems that efficiently implement availability domain aware replication policies in distributed storage platforms. As an option, one or more variations of availability domain aware replication scenario 1B100 or any aspect thereof may be implemented in the context of the architecture and functionality of the embodiments described herein. The availability domain aware replication scenario 1B100 or any aspect thereof may be implemented in any environment.

As earlier described in FIG. 1A, certain scaling operations in a distributed storage platform might result in a node topology $110_2$ having an associated instance of an availability domain unaware replication configuration $106_1$. In this case, a replication configurator $120_1$ implemented according to the herein disclosed techniques can apply certain heuristics-based informed search techniques to efficiently select an availability domain aware replication configuration.

Specifically, and as shown, such techniques might generate an availability domain aware replication configuration $104_2$. The heuristics-based informed search techniques applied can facilitate selecting an availability domain aware replication configuration (e.g., availability domain aware replication configuration $104_2$) in a manner that is efficient (e.g., minimum computations) and/or optimal. For example, an efficient characteristic of the selection technique might correspond to minimizing the number of computations associated with selecting the availability domain aware replication configuration $104_2$. An optimal characteristic of the selection technique might correspond to minimizing the number of changed node positions associated with selecting the availability domain aware replication configuration $104_2$. As an example, the availability domain aware replication configuration $104_2$ differs from the availability domain unaware replication configuration $106_2$ by two changed node positions (e.g., changed node position $116_1$ and changed node position $116_2$).

With the availability domain aware replication configuration $104_2$ generated by the herein disclosed techniques, the replication configuration can facilitate a replication policy compliance upon failure of the availability domain $102_C$ (e.g., failed availability domain 103). Specifically, and as shown by availability domain aware replication configuration $104_3$, should a failure event occur (e.g., the shown "C-block failure), which failure results in failure of all of the nodes in the C-block, the availability domain aware replication configuration $104_3$, is still able to function since the failure of the C-block does not bring down any two neighboring nodes.

In some systems (e.g., hyperconverged distributed computing systems), the nodes in the systems are organized according to hierarchically related availability domains. Furthermore, the entities (e.g., data, metadata, services, etc.) of the systems that are replicated over the nodes and associated hierarchical availability domains can vary. The following discloses forming replication configurations over hierarchical availability domains and/or over various types of replicated entities in further details.

FIG. 1B2 depicts a metadata replication configuration generation scenario 1B200 as exhibited by systems that facilitate implementing hierarchical availability domain aware replication policies in hyperconverged distributed computing environments. As an option, one or more variations of metadata replication configuration generation scenario 1B200 or any aspect thereof may be implemented in the context of the architecture and functionality of the embodiments described herein. The metadata replication configuration generation scenario 1B200 or any aspect thereof may be implemented in any environment.

FIG. 1B2 illustrates aspects pertaining to applying context-based node selection techniques over hierarchical availability domains to form availability domain aware replication configurations. Specifically, the figure is being presented to illustrate an example scenario facilitated by the herein disclosed techniques for forming an availability domain aware replication configuration for replicating metadata at a computing system comprising hierarchical availability domains.

As used herein, availability domains are or refer to boundaries around hardware (e.g., computing nodes, network interfaces, power supplies, etc.) where the hardware within a particular boundary is associated with a common power source. For example, several computing nodes within a rackable unit might be powered by a single power supply that provides direct current power to the computing nodes, and which is situated within the physical boundary of the rackable unit. As another example, a rack comprising multiple rackable units might be powered by a single uninterruptable power supply that provides alternating current to the rack. A hierarchical relationship between availability domains is formed where a first availability domain (e.g., a rackable unit) is fully contained within a second availability domain (e.g., a rack). Such hierarchical relationships can be formed at still higher levels of hierarchy, such as where a second availability domain (e.g., a rack) is fully contained within a third availability domain (e.g., a site), and so on. As such, a higher-level hierarchical availability domain may comprise multiple lower-level availability domains.

An example of such an organization is presented in FIG. 1B2. Specifically, FIG. 1B2 depicts a computing system (e.g., hyperconverged distributed computing system) comprising a set of nodes that are situated within two or more hierarchical availability domains (e.g., node "01" through node "25"). As shown, some of the nodes are distributed across a first set of availability domains (e.g., availability domain $102_{01}$ and availability domain $102_{02}$) at a first availability domain level. As shown, there are multiple levels of hierarchical availability domains. In this example, each of the availability domains at the first availability domain level corresponds to a particular computing "site" or data center. Fully contained within the availability domains at the first availability domain level are a second set of availability domains (e.g., availability domain $102_{11}$, availability domain $102_{12}$, availability domain $102_{13}$, availability domain $102_{14}$, and availability domain $102_{15}$) at a second availability domain level. An availability domain at the second availability domain level might correspond to a "rack" of nodes. A third set of availability domain domains (e.g., availability domain $102_{21}$, availability domain $102_{22}$, availability domain $102_{23}$, availability domain $102_{24}$, availability domain $102_{25}$, availability domain $102_{26}$, availability domain $102_{27}$, and availability domain $102_{28}$) at a third level are fully contained within the availability domains at the second availability domain level. As shown, each of the availability domains at the third availability domain level can correspond to a "block" of nodes (e.g., a node appliance consuming one or more rack units in a rack).

As illustrated, the herein disclosed techniques can be carried out at least in part by an instance of replication configurator $120_1$ to form an availability domain aware replication configuration $104_4$ for replicating metadata over the nodes of the system. Specifically, metadata replication configuration generation scenario 1B200 illustrates an application of the herein disclosed techniques for a metadata replication policy having a fault tolerance of two (e.g., FT=2), which is equivalent to a replication factor of five (e.g., RF=FT·2+1=5). In this case, a target availability domain level having at least five availability domains is required to achieve availability domain awareness in a replication configuration. For the hierarchical availability domains in FIG. 1B2, the "rack" level of availability domains (e.g., availability domain $102_{11}$, availability domain $102_{12}$, availability domain $102_{13}$, availability domain $102_{14}$, and availability domain $102_{15}$) is the highest level that meets or exceeds the foregoing requirement.

With the target availability domain level (e.g., "rack" level) selected, a set of partitions (e.g., partition $114_0$, partition $114_1$, partition $114_2$, partition $114_3$, and partition $114_4$) or are formed from a sorted list of availability domains, where the sort key is the number of nodes in a particular target availability domain.

The sorting can be carried out using any known sorting techniques. In one embodiment, the availability domains within the target availability domain level are sorted based on the number of nodes in each subject availability domain. In another embodiment, the highest-level availability domains are sorted based on the number of nodes in a corresponding availability domain. In the shown example, sorting of the availability domains is initiated at rack level. When there are two or more availability domains that have same number of nodes, a second sort key can be used.

The availability domains within the target availability domain level are sorted by their respective number of nodes. For example, if the target availability domain is at the rack level, then the rack availability domains are sorted by the number of nodes in each corresponding rack. In the depiction of FIG. 1B200, the rack level availability domains are availability domain $102_{11}$, availability domain $102_{12}$, availability domain $102_{14}$, and availability domain $102_{15}$. In the event that there are availability domains at a lower level than the target availability domain, those lower level availability domains are sorted as well by their respective number of nodes. In the event that there are still further availability domains at still lower levels, then those lower level availability domains are sorted by their respective number of nodes, and so on.

The target availability domain can be user determined. In this example, the target availability domain is determined to be at the rack level. Accordingly, and as shown, the sorted target availability domains in metadata replication configuration generation scenario 1B200 are as follows: availability domain $102_{21}$, availability domain $102_{22}$, availability domain $102_{25}$, availability domain $102_{27}$, availability domain $102_{28}$, availability domain $102_{23}$, availability domain $102_{24}$, and availability domain $102_{26}$. One node from each of the availability domains at the target availability domain level is selected, in sequence, according the sort order. Each next selected node is added to the subject partition. As an example, partition $114_0$ comprises node "01" from availability domain $102_{11}$, node "06" from availability domain $102_{12}$, node "12" from availability domain $102_{13}$, node "18" from availability domain $102_{14}$, and node "21" from availability domain $102_{15}$. When the partitions are all populated, they are linked together to form the availability domain aware replication configuration $104_4$.

As indicated above, once a target hierarchical level is defined, a multi-level sorting order can be established. For further illustration, and continuing discussion of this example, the multi-level sort key is based firstly on number of nodes in the target hierarchical availability domain level and secondly on the number of nodes in the next hierarchically lower availability domain level. Specifically, since target hierarchical level of "rack" is defined, a first level sort key is based on a first number of nodes in the racks and the second level sort key is based on a second number of nodes in the blocks of a corresponding parent rack.

In this example, all racks have the same number of nodes, so the first level sort key can be merely the order of appearance in the topology. The second level sort key is based on a second number of nodes in the next hierarchically lower availability domain level. In this example, the 5 node rack that comprises availability domain $102_{12}$ has 3 nodes in block-level availability domain $102_{22}$ and 2 nodes in block-level availability domain $102_{23}$. Accordingly, when mapping a computing entity into the 5 node rack that comprises availability domain $102_{12}$, a node (e.g., node '06') from the 3 node block-level availability domain $102_{22}$ would be selected before choosing a node from the 2 node block-level availability domain $102_{23}$, since 3 is larger than 2. Similarly, when mapping a computing entity into the 5 node rack that comprises availability domain $102_{13}$, a node (e.g., node "12") from the 4 node block-level availability domain $102_{25}$ would be selected before choosing a node from the 1 node block-level availability domain $102_{24}$, since 4 is larger than 1. Observance of this multi-level sort is carried out until all partitions have been populated.

Metadata replication configuration generation scenario 1B200 illustrates how the herein disclosed techniques facilitate generation of an availability domain aware replication configuration (e.g., availability domain aware replication configuration $104_4$) for metadata in the presence of hierarchical availability domains. One embodiment of a context-based technique for generating metadata replication configurations over hierarchical availability domains is disclosed in detail as follows.

FIG. 1B3 presents a metadata replication technique 1B300 as applied in systems that facilitate implementing hierarchical availability domain aware replication policies in hyperconverged distributed computing environments. As an option, one or more variations of metadata replication technique 1B300 or any aspect thereof may be implemented in the context of the architecture and functionality of the embodiments described herein. The metadata replication technique 1B300 or any aspect thereof may be implemented in any environment.

FIG. 1B3 illustrates aspects pertaining to applying context-based node selection techniques over hierarchical availability domains to form availability domain aware replication configurations. Specifically, the figure is presented to illustrate one embodiment of certain steps and/or operations for generating availability domain aware replication for metadata in the presence of hierarchical availability domains.

Metadata replication technique 1B300 commences by receiving a request to allocate replicas of metadata over various nodes in a computing system in accordance with a replication policy (step 171). For example, the replication policy might indicate that the replicated metadata are to be availability domain aware subject to a certain fault tolerance and/or replication factor. In most cases, a replication configuration is required to allocate the replicas so as to comply with such replication policies. Furthermore, the node topology of the computing system (e.g., cluster) is often established in expectation of a particular replication policy such that the node topology is capable of achieving at least one availability domain aware replication configuration.

In response to receiving the request, a hierarchy of availability domains associated with the nodes is analyzed to determine a target availability domain level (step $172_1$). As an example, for a replication policy that defines a replication factor of five (e.g., RF=5), the highest availability domain level associated with the hierarchy of availability domains that has at least five availability domains might be selected as the target availability domain level.

Once the target availability domain level is determined, the sorting can take place. In this example, the availability domains at and below the target availability domain level are recursively sorted by the number of nodes in each availability domain (step 173). The size of a partition is defined by the maximum number of nodes in any target availability domain, which in turn determines the number of partitions. That is, the number of partitions is the total number of nodes under consideration divided by the size of a partition, plus one if there is a remainder. The sorted list of availability domains can be used to define the size value of a partition, which size value is in turn used to determine the number of partitions (e.g., node sequences) of a replication configuration (step 174).

Each partition is then populated with one node from each of the availability domains at the target availability domain level (step 175). If there are five availability domains at the target availability domain level, then each partition will comprise a unique set of five nodes, with each being from a different availability domain. When all partitions are populated, the partitions are linked together to form a hierarchical availability domain aware replication configuration for the metadata (step 176). The hierarchical availability domain aware replication configuration is then consulted to replicate the metadata over the nodes in the computing system (step 177).

The herein disclosed techniques can apply to computing system entities other than metadata. More specifically, the disclosed techniques can apply to any computing entities (e.g., metadata partitions, data replicas, computing services, etc.) that can be organized into hierarchical availability domain aware replication configurations. Strictly as one example, computing entities in the specific form of replicated data extents can be organized into hierarchical availability domain aware replication configurations such that a failure that impacts the availability of one particular availability domain would not cause unavailability of the overall system. A representative scenario pertaining to replicating data according to the herein disclosed techniques is discussed in detail as follows.

FIG. 1B4 depicts a data replication configuration generation scenario 1B400 as exhibited by systems that facilitate implementing hierarchical availability domain aware replication policies in hyperconverged distributed computing environments. As an option, one or more variations of data replication configuration generation scenario 1B400 or any aspect thereof may be implemented in the context of the architecture and functionality of the embodiments described herein. The data replication configuration generation scenario 1B400 or any aspect thereof may be implemented in any environment.

FIG. 1B4 illustrates aspects pertaining to applying context-based node selection techniques over hierarchical availability domains to form availability domain aware replication configurations. Specifically, the figure is being presented to illustrate an example scenario facilitated by the herein disclosed techniques for forming an availability domain aware replication configuration for replicating data at a computing system comprising hierarchical availability domains.

FIG. 1B4 depicts a computing system (e.g., hyperconverged distributed computing system) comprising a set of storage facilities (e.g., storage facility "01" through storage facility "25") associated with a first set of availability domains (e.g., availability domain $102_{01}$ and availability domain $102_{02}$) at a first availability domain level. As an example, each of the availability domains at the first availability domain level might correspond to a particular computing "site" or data center. Fully contained within the availability domains at the first availability domain level are a second set of availability domains (e.g., availability domain $102_{11}$, availability domain $102_{12}$, availability domain $102_{13}$, availability domain $102_{14}$, and availability domain $102_{15}$) at a second availability domain level. An availability domain at the second availability domain level might correspond to a "rack" of nodes that comprise the storage facilities. A third set of availability domain domains (e.g., availability domain $102_{21}$, availability domain $102_{22}$, availability domain $102_{23}$, availability domain $102_{24}$, availability domain $102_{25}$, availability domain $102_{26}$, availability domain $102_{27}$, and availability domain $102_{28}$) at a third level are fully contained within the availability domains at the second availability domain level. As shown, each of the availability domains at the third availability domain level can correspond to a "block" of nodes having storage facilities (e.g., a node appliance consuming one or more rack units in a rack).

As illustrated, the herein disclosed techniques can be carried out at least in part by an instance of replication configurator $120_1$. Strictly as an example, consider an extent group that is rooted at storage facility "03". In this example, replication configurator $120_1$ serves to form an availability domain aware replication configuration $104_5$ for extent group $109_1$ and extent group $109_2$. Specifically, extent group $109_1$ derives from storage facility "03" and uses other storage facilities at the computing system. The other storage facilities of the computing system are selected based on health and loading of the other storage facilities.

Continuing the example, an availability domain aware replication configuration $104_6$ can also be generated for replicating an extent group $109_2$ from storage facility "20" over other storage facilities at the computing system. The data replication configuration generation scenario 1B400 illustrates an application of the herein disclosed techniques for a data replication policy having a fault tolerance of two (e.g., FT=2), which is equivalent to a replication factor of three (e.g., RF=FT+1=3). In this case, a target availability domain level having at least three availability domains is required to achieve availability domain awareness in this replication configuration. For the hierarchical availability domains in FIG. 1B4, the "rack" level of availability domains (e.g., availability domain $102_{11}$, availability domain $102_{12}$, availability domain $102_{13}$, availability domain $102_{14}$, and availability domain $102_{15}$) is the highest level that meets or exceeds the foregoing requirement.

With the target availability domain level (e.g., "rack" level) determined, one storage facility from each of the availability domains at the target availability domain level is selected for inclusion in a replication configuration. For example, the storage facilities in the availability domains might be traversed randomly to select healthy storage facilities that are in unique availability domains for the replication configuration. As shown, for example, in addition to the source storage facility "03" from availability domain $102_{11}$, storage facility "09" from availability domain $102_{12}$, and storage facility "14" from availability domain $102_{13}$, are selected to comprise availability domain aware replication configuration $104_5$ for extent group $109_1$. As can be observed, other storage facilities for other replications might be selected. In the second example as shown on the right of FIG. 1B4, three storage facilities are selected to comprise availability domain aware replication configuration $104_6$ for extent group $109_2$. (i.e., involving source storage facility "20", storage facility "12", and storage facility "21").

In some cases, a sufficient number of healthy storage facilities at the target availability domain level to complete a replication configuration may not be available and/or discoverable. In such cases, a target availability domain that is one level lower than the then-current target availability domain level is selected, and the foregoing storage facility selection operations are repeated in accordance with the new target availability domain level to generate an availability domain aware replication configuration for the data (e.g., extent group $109_1$, extent group $109_2$, etc.).

Data replication configuration generation scenario 1B400 illustrates how the herein disclosed techniques facilitate generation of an availability domain aware replication configuration (e.g., availability domain aware replication configuration $104_5$ and availability domain aware replication configuration $104_6$) for data in the presence of hierarchical availability domains. One embodiment of a context-based technique for generating data replication configurations over hierarchical availability domains is disclosed in detail as follows.

FIG. 1B5 presents a data replication node selection technique 1B500 as applied in systems that facilitate implementing hierarchical availability domain aware replication policies in hyperconverged distributed computing environments. As an option, one or more variations of data replication node selection technique 1B500 or any aspect thereof may be implemented in the context of the architecture and functionality of the embodiments described herein. The data replication node selection technique 1B500 or any aspect thereof may be implemented in any environment.

FIG. 1B5 illustrates aspects pertaining to applying context-based node selection techniques over hierarchical availability domains to form availability domain aware replication configurations. Specifically, the figure is presented to illustrate one embodiment of certain steps and/or operations for generating availability domain aware replication for data in the presence of hierarchical availability domains.

Data replication node selection technique 1B500 commences by receiving a request to allocate replicas of data (e.g., extent groups, etc.) over various nodes in a computing system in accordance with a replication policy (step 181). For example, the replication policy might indicate that the replicated data (e.g., extent groups) are to be availability domain aware subject to a certain fault tolerance and/or replication factor requirements. In most cases, a replication configuration is required to allocate the replicas so as to comply with such replication policies. Furthermore, the node topology of the computing system (e.g., cluster) is often established in expectation of a particular replication policy such that the node topology is capable of achieving at least one availability domain aware replication configuration. In response to receiving the request, the storage facilities at the nodes that are capable of storing the data replicas are enumerated (step 182). For example, certain storage facilities might be designated for purposes other than storing replicas or might not have sufficient capacity for storing replicas. The hierarchy of availability domains associated with the nodes (and associated storage facilities) is analyzed to determine a target availability domain level (step $172_2$). As an example, for a replication policy that defines a replication factor of three (e.g., RF=3), the highest availability domain level associated with the hierarchy of availability domains that has at least three availability domains might be selected as the target availability domain level.

When the target availability domain level is determined, each storage facility from the enumerated storage facilities is examined to determine whether to include the storage facility in the replication configuration. Specifically, a particular storage facility might be selected (e.g., in a random manner) to determine whether the health of the storage facility is sufficient for storing a data replica. If the storage facility is not healthy ("No" path of decision 183), then another storage facility is selected. If the storage facility is healthy ("Yes" path of decision 183), then the availability domain of the storage facility that is associated with the target availability domain level is identified. If the availability domain of the storage facility is the same as another storage facility in the replication configuration ("No" path of decision 184), adding the storage facility to the replication configuration would make the replication configuration availability domain unaware. In this case, the storage facility is not added and a different storage facility from the enumerated storage facilities is selected for examination. If the availability domain of the storage facility is different from the availability domains of any storage facility in the replication configuration, then addition of the candidate storage facility to the replication configuration would be domain unaware ("Yes" path of decision 184), and as such, the storage facility is added to the replication configuration (step 185).

When all of the enumerated storage facilities are examined, the replication configuration is analyzed for completeness. In some cases, the replication configuration might be analyzed for completeness after a storage facility is added to the replication configuration. One measure of completeness is the number of storage facilities comprising a particular replication configuration. As an example, for a replication policy having a replication factor of three (e.g., RF=3), an availability domain aware replication configuration is complete when it comprises at least three storage facilities from different availability domains from the target availability domain level. If the replication configuration is deemed complete ("Yes" path of decision 186), then the data is replicated according to the hierarchical availability domain aware replication configuration (step 188). If the replication configuration is not considered complete ("No" path of decision 186), a target availability domain level that is one level lower than the then-current target availability domain level is selected (step 187), and the storage facility selection process is repeated at the new target availability domain level. The storage facility selection and level adjustment operations are repeated until an availability domain aware replication configuration is discovered.

The foregoing discussion pertains to generating hierarchical availability domain aware replication configurations for data in accordance with the herein disclosed techniques. A representative scenario pertaining to replicating services according to the herein disclosed techniques is discussed in detail as follows.

FIG. 1B6 depicts a service replication configuration generation scenario 1B600 as exhibited by systems that facilitate implementing hierarchical availability domain aware replication policies in hyperconverged distributed computing environments. As an option, one or more variations of service replication configuration generation scenario 1B600 or any aspect thereof may be implemented in the context of the architecture and functionality of the embodiments described herein. The service replication configuration generation scenario 1B600 or any aspect thereof may be implemented in any environment.

FIG. 1B6 illustrates aspects pertaining to applying context-based node selection techniques over hierarchical availability domains to form availability domain aware replication configurations. Specifically, the figure is being presented to illustrate an example scenario facilitated by the herein disclosed techniques for forming an availability domain aware replication configuration for replicating services and/or other entities (e.g., servers, applications, agents, etc.) at a computing system comprising hierarchical availability domains.

FIG. 1B6 depicts a computing system (e.g., hyperconverged distributed computing system) comprising a set of nodes (e.g., node "11" through node "25") associated with a first set of availability domains (e.g., availability domain $102_{02}$) at a first availability domain level. As an example, availability domain $102_{02}$ might correspond to a particular computing "site" or data center. Fully contained within availability domain $102_{02}$ at the first availability domain level are a second set of availability domains (e.g., availability domain $102_{13}$, availability domain $102_{14}$, and availability domain $102_{15}$) at a second availability domain level. An availability domain at the second availability domain level might correspond to a "rack" of nodes. A third set of availability domain domains (e.g., availability domain $102_{24}$, availability domain $102_{25}$, availability domain $102_{26}$, availability domain $102_{27}$, and availability domain $102_{28}$) at a third level are fully contained within the availability domains at the second availability domain level. As shown, each of the availability domains at the third availability domain level can correspond to a "block" of nodes (e.g., a node appliance consuming one or more rack units in a rack).

As illustrated, the herein disclosed techniques can be carried out at least in part by an instance of replication configurator $120_1$ to form an initial replication configuration 105 and an adjusted availability domain aware replication configuration 107 for replicating a computing service (e.g., service $113_1$) over certain nodes at the computing system. In service replication configuration generation scenario 1B600, service $113_1$ is replicated over the nodes by replicating an instance (e.g., image) of a server 111 that hosts the service $113_1$ over the nodes. Furthermore, service replication configuration generation scenario 1B600 depicts an application of the herein disclosed techniques for a service replication policy having a fault tolerance FT=2, which is equivalent to a replication factor of five (e.g., RF=FT·2+1=5). As such, five replicas of service $113_1$ (and server 111) are required to comply with the policy.

When generating an initial replication configuration for service replicas, the herein disclosed techniques form an initial replication configuration (e.g., initial replication configuration 105) that places the replicas over the various availability domain levels starting with the highest availability domain level (e.g., the "site" level). At each availability domain level, a node within the level is selected (e.g., randomly) for inclusion in the replication configuration. If more replicas are to be placed, additional nodes are selected from the next lower availability domain level. The forgoing recursive process continues until all replicas (e.g., RF replicas) are accounted for in the replication configuration.

As indicated in initial replication configuration 105, the foregoing process for generating an initial replication configuration can result in a replication configuration that does not maximize the FT over all availability domain levels. Specifically, with three of the five replicas placed in availability domain $102_{25}$, the initial replication configuration 105 does not maximize the FT at the "block" availability domain level. In such cases, the herein disclosed techniques analyze the then-current replication configuration and/or other information to adjust the replication configuration so as to maximize the FT over all availability domain levels. As indicated in adjusted availability domain aware replication configuration 107, techniques implemented at replication configurator $120_1$ can modify the replication configuration for service $113_1$ to place replicas of server 111 at node "11" in availability domain $102_{24}$ and node "20" in availability domain $102_{27}$. As such, the FT associated with the "block" availability domain level is five.

Service replication configuration generation scenario 1B600 illustrates how the herein disclosed techniques facilitate generation of an availability domain aware replication configuration (e.g., adjusted availability domain aware replication configuration 107) for services and/or other entities in the presence of hierarchical availability domains. One embodiment of a context-based technique for generating service replication configurations over hierarchical availability domains is disclosed in detail as follows.

FIG. 1B7 presents a service replication node selection technique 1B700 as applied in systems that facilitate implementing hierarchical availability domain aware replication policies in hyperconverged distributed computing environments. As an option, one or more variations of service replication node selection technique 1B700 or any aspect thereof may be implemented in the context of the architecture and functionality of the embodiments described herein. The service replication node selection technique 1B700 or any aspect thereof may be implemented in any environment.

FIG. 1B7 illustrates aspects pertaining to applying context-based node selection techniques over hierarchical availability domains to form availability domain aware replication configurations. Specifically, the figure is presented to illustrate one embodiment of certain steps and/or operations for generating availability domain aware replication for services and/or other entities in the presence of hierarchical availability domains.

Service replication node selection technique 1B700 commences by receiving a request to allocate replicas of a service and/or other entities (e.g., servers, applications, agents, etc.) over various nodes in a computing system in accordance with a replication policy (step 191). For example, the replication policy might indicate that the replicated service (or server hosting the service) are to be availability domain aware subject to a certain fault tolerance and/or replication factor requirement. In most cases, a replication configuration is required to allocate the replicas so as to comply with such replication policies. Furthermore, the node topology of the computing system (e.g., cluster) is often established in expectation of a particular replication policy such that the node topology is capable of achieving at least one availability domain aware replication configuration. In response to receiving the request, the hierarchy of availability domains associated with the nodes is analyzed to determine a target availability domain level (step $172_3$). In some cases, the target availability domain level might correspond to the highest availability domain level having a number of availability domains that equal the replication factor. In other cases, the target availability domain might merely be the highest availability domain level present in the computing system.

When the target availability domain level is determined, the availability domains are recursively listed over the hierarchy starting from the target availability domain level (step 192). As an example, the list might be generated by traversing the availability domains at each level in a round robin manner starting with an availability domain that is randomly chosen. When the target availability domain level is the highest availability domain level present in the computing system, the list will comprise all availability domains at the system. An initial replication configuration is generated by selecting, in the list order, a node for storing a replica from each availability domain (step 193). As an example, if five replicas of the service are required to satisfy a fault tolerance of two (e.g., FT=2), then five nodes will be selected from the list to form the replication configuration.

As earlier discussed, a replication configuration generated according to service replication node selection technique 1B700 might be improved at least as it pertains to certain quantitative characteristics of the replication configuration. For example, the FT of each of the availability domain levels for a particular replication configuration might be improved. In some cases, the replication configuration may not be availability domain aware at one or all availability domain levels. If no improvements are necessary ("No" path of decision 195), then the replication configuration is availability domain aware over at least one availability domain level, and the service is replicated in accordance with the replication configuration (step 197). If improvement opportunities are detected ("Yes" path of decision 195), the replication configuration is adjusted to achieve such improvements (step 196). For example, the distribution of nodes included in the replication configuration might be rebalanced to increase the FT at one or more availability domain levels. When all improvement opportunities are exhausted ("No" path of decision 195), then the service is replicated in accordance with the replication configuration (step 197).

Various approaches to performing the aforementioned improvements can be implemented. As merely one example, replication configuration adjustments to achieve improvements might be constrained to moving one replica placement (e.g., node) in the replication configuration at a time. In this case, the source replica to migrate can be selected based at least in part on various factors, such as the then-current balance of the replicas at the various availability domain levels (e.g., a replica from the availability domain with the most replicas will be selected as the source replica). If there is a tie between the replicas (e.g., the replicas are balanced over the availability domains), then a tiebreaker is applied to select a source replica. As one example tiebreaker, the uptime of a service might be consulted to break a tie between two or more replicas. A target node to receive the source node is then determined. As another example tiebreaker, a healthy node in an availability domain that doesn't currently have a service replica might be selected. When a source replica and target node are selected, certain quantitative characteristics (e.g., FT over the availability domain levels) associated with the adjusted replication configuration are evaluated to determine if an improvement over the then-current replication configuration is achieved. If the quantitative characteristics indicate an improvement over the then-current replication configuration is achieved, the adjusted replication configuration is implemented.

One embodiment depicting an implementation of the herein disclosed techniques is shown and described as pertaining to FIG. 1C1.

FIG. 1C1 depicts implementation techniques 1C100 as used when implementing availability domain aware replication policies in distributed storage platforms. As an option, one or more variations of implementation techniques 1C100 or any aspect thereof may be implemented in the context of the architecture and functionality of the embodiments described herein. The implementation techniques 1C100 or any aspect thereof may be implemented in any environment.

As shown in FIG. 1C1, the replication configurator 120₁ earlier described can interact with various components in a distributed storage platform to implement the herein disclosed techniques. Specifically, the replication configurator 120₁ might interact with various data provided by resource manager 132. In some cases, instances of the resource manager 132 might run on one or more nodes in a cluster with an elected leader instance. Resource manager 132 can provide certain instances of topology data 134 and/or instances of policy data 136 to the replication configurator 120₁. Specifically, the resource manager 132 can continually monitor (at operation 151) the nodes in the cluster to detect changes to the node topology such as added nodes, remove nodes, failed nodes, and/or other node topology characteristics. In some cases, a "snitch" service can provide information about the node topology.

Information about the then-current node topology can be codified in topology data 134 at least in part as a set of node topology attributes 152₁. For example, the node topology attributes 152₁ can comprise certain attributes corresponding to each node such as a node identifier or nodeID, an availability domain identifier or availDomainID, a site identifier or siteID, a host identifier or hostID, an IP address or IPaddress, a node state or state (e.g., pertaining node health, loading, etc.), and/or other attributes. Resource manager 132 can further continually update (at operation 153) policy data 136 based at least in part on user input (e.g., user 101₁), an enterprise policy file, and/or other policy data sources. For example, policy data 136 might specify a replication factor requirement (e.g., RF=3), or might specify a preferred site or host or IP address, etc.

When an availability domain unaware replication configuration is detected, a configuration generator 122 at the replication configurator 120₁ can use any data (e.g., topology data 134, policy data 136, etc.) available to replication configurator 120₁ to generate one or more instances of neighboring replication configurations 162. A selection engine 124 at replication configurator 120₁ can select a selected replication configuration 164₁ that is availability domain aware based at least in part on one or more of neighboring replication configurations 162.

Selection engine 124 can use various instances of selection data 126 to facilitate the selection of the selected replication configuration 164₁. For example, a set of configuration metrics 156 corresponding to the then-current replication configuration and/or the neighboring replication configurations 162 generated by the configuration generator 122 might be used to determine the selected replication configuration 164₁. For example, the configuration metrics 156 might comprise a configuration score (CS) that is the sum of all the node scores (NS) for each of the ring nodes in the replication configuration, which node scores measure a minimum distance (e.g., number of positions or ring nodes) from a given ring node to the nearest ring node from the same availability domain. The configuration score might also be referred to as a block aware score or a rack aware score. In an availability domain aware replication configuration, the node score for each of the ring nodes in the ring structure is equal to or greater than the replication factor minus one (e.g., NS≥RF−1). A replication configuration can be determined to be availability domain aware when its configuration score is equal to or greater than a configuration score threshold (CST). Specifically, the CST can be defined as, $$CST = N \cdot (RF-1) \qquad (EQ.\ 1)$$

where:
N=number of nodes, and
RF=replication factor.

Configuration metrics 156 might further include a maximum consecutive node score (MCN) that measures the maximum number of consecutive ring nodes in the replication configuration that are availability domain aware (e.g., NS≥RF−1). In some embodiments, selection engine 124 can also use a heuristic function 154 to facilitate selecting the selected replication configuration $164_1$. In certain embodiments, heuristic function 154, configuration metrics 156, and/or other information can be used in combination with an informed search technique to efficiently and/or optimally determine the selected replication configuration $164_1$. For example, the informed search technique might be based at least in part on an A* search algorithm, a breadth first search algorithm, a best first search algorithm, a greedy approach, a pruning technique, and/or other techniques and/or combinations thereof.

Selected replication configuration $164_1$ can be stored in a set of configuration data 128 for access by a replication service 138. Specifically, replication service 138 might run on each node in a cluster to manage replication of metadata $142_1$ to a set of replicated metadata 144 distributed throughout the distributed storage platform. Information pertaining to selected replication configuration $164_1$ and/or other replication configurations can be codified in configuration data 128 at least in part as a set of replication configuration attributes 158. For example, replication configuration attributes 158 can comprise certain attributes corresponding to a given replication configuration such as a node identifier or nodeID, a token identifier or token, an IP address or IPaddress, a data center or dataCenter, a rack identifier or rack, a predecessor node identifier or preNodeID, a successor node identifier or postNodeID, and/or other attributes. As an example, the token attribute, the preNodeID attribute, and/or the postNodeID attribute might be used to determine a node relationship. The replication configuration can continually select (at operation 155) a new instance of a selected replication configuration $164_1$ based at least in part on node topology changes (e.g., scaling, policy data changes) and/or other dynamic events.

Further details regarding general approaches to continually selecting new replication configurations are described in U.S. application Ser. No. 15/818,660 titled "ESTABLISHING AND MAINTAINING DATA APPORTIONING FOR AVAILABILITY DOMAIN FAULT TOLERANCE", filed on Nov. 20, 2017, which is hereby incorporated by reference in its entirety.

The implementation of the herein disclosed techniques discussed in FIG. 1C1 can be configured to generate replication configurations over hierarchical availability domains and/or over various types of replicated entities as disclosed in detail as follows.

FIG. 1C2 is a block diagram of a system 1C200 that implements hierarchical availability domain aware replication policies in hyperconverged distributed computing environments. As an option, one or more variations of system 1C200 or any aspect thereof may be implemented in the context of the architecture and functionality of the embodiments described herein. The system 1C200 or any aspect thereof may be implemented in any environment.

FIG. 1C2 illustrates aspects pertaining to applying context-based node selection techniques over hierarchical availability domains to form availability domain aware replication configurations. Specifically, the figure is being presented to show one embodiment of certain representative components and associated data flows that describe how the herein disclosed techniques might be implemented to generate and apply replication configurations over hierarchical availability domains and/or over various types of replicated entities. The components and data flows shown in FIG. 1C2 present one partitioning and associated data manipulation approach. The specific example shown is purely exemplary, and other subsystems, data structures, and/or partitionings are reasonable.

As shown in FIG. 1C2, system 1C200 comprises various components earlier described as pertains to FIG. 1C1. Specifically shown are replication configurator $120_1$ comprising configuration generator 122 and selection engine 124, resource manager 132, topology data 134, policy data 136, selection data 126, configuration data 128, and replication service 138. Further shown is an instance of node topology attributes $152_2$ that serve to codify the hierarchically related availability domains associated with a node topology of system 1C200.

Specifically, node topology attributes $152_2$ indicate that a data record (e.g., table row or object instance) for a particular node topology might describe a node identifier (e.g., stored in a "node ID" field), a list of availability domains associated with the node (e.g., stored in a "domains[ ]" object), a site identifier (e.g., stored in a "siteID" field), a host identifier (e.g., stored in a "hostID" field), an IP address (e.g., stored in an "IPaddress" field), a node state indicator (e.g., stored in a "state" field), and/or other attributes. As further depicted in node topology attributes $152_2$, each instance of the "domains[ ]" object describes an availability domain identifier (e.g., stored in an "availDomainID" field), an availability domain level (e.g., stored in a "level" field), and/or other attributes associated with a particular availability domain.

In addition to providing instances of the foregoing node topology attributes and/or instances of policy data 136 to replication configurator $120_1$, resource manager 132 issues instances of replication requests 163 to replication service 138 through replication configurator $120_1$. Such replication requests might be issued in response to detecting instances of configuration events 161 at resource manager 132. For example, configuration events 161 triggered by added nodes, removed nodes, failed nodes, and/or other node topology changes can invoke certain instances of replication requests 163.

The replication requests 163 are intercepted by replication configurator $120_1$ to select and/or generate instances of hierarchical availability domain aware replication configurations 159 that are accessed at configuration data 128 by replication service 138 to carry out the requests over the hierarchical availability domains and/or various types of replicated entities at system 1C200 (operation 157). Specifically, a context detector 165 at configuration generator 122 determines the context of each replication request. For example, the context of a replication request might be characterized by the type of replicated entity, the target availability domain level, the policy, and/or other aspects associated with the request. As can be observed by a set of entities 143 at system 1C200, the replicated entities associated with replication requests 163 can comprise metadata, extent groups 109, services 113, and/or other entities. Replication service 138 accesses the hierarchical availability domain aware replication configurations 159 to allocate a set of replicated entities 145 over the compute and storage resources of system 1C200.

As earlier described, the herein disclosed techniques can address the problems attendant to implementing replication policies on highly scalable and active distributed computing and storage systems (e.g., hyperconverged distributed computing systems) having dynamic node topologies. Embodiments of environments comprising such a highly dynamic and/or scalable distributed infrastructure is shown and described as follows.

Figure 2A:
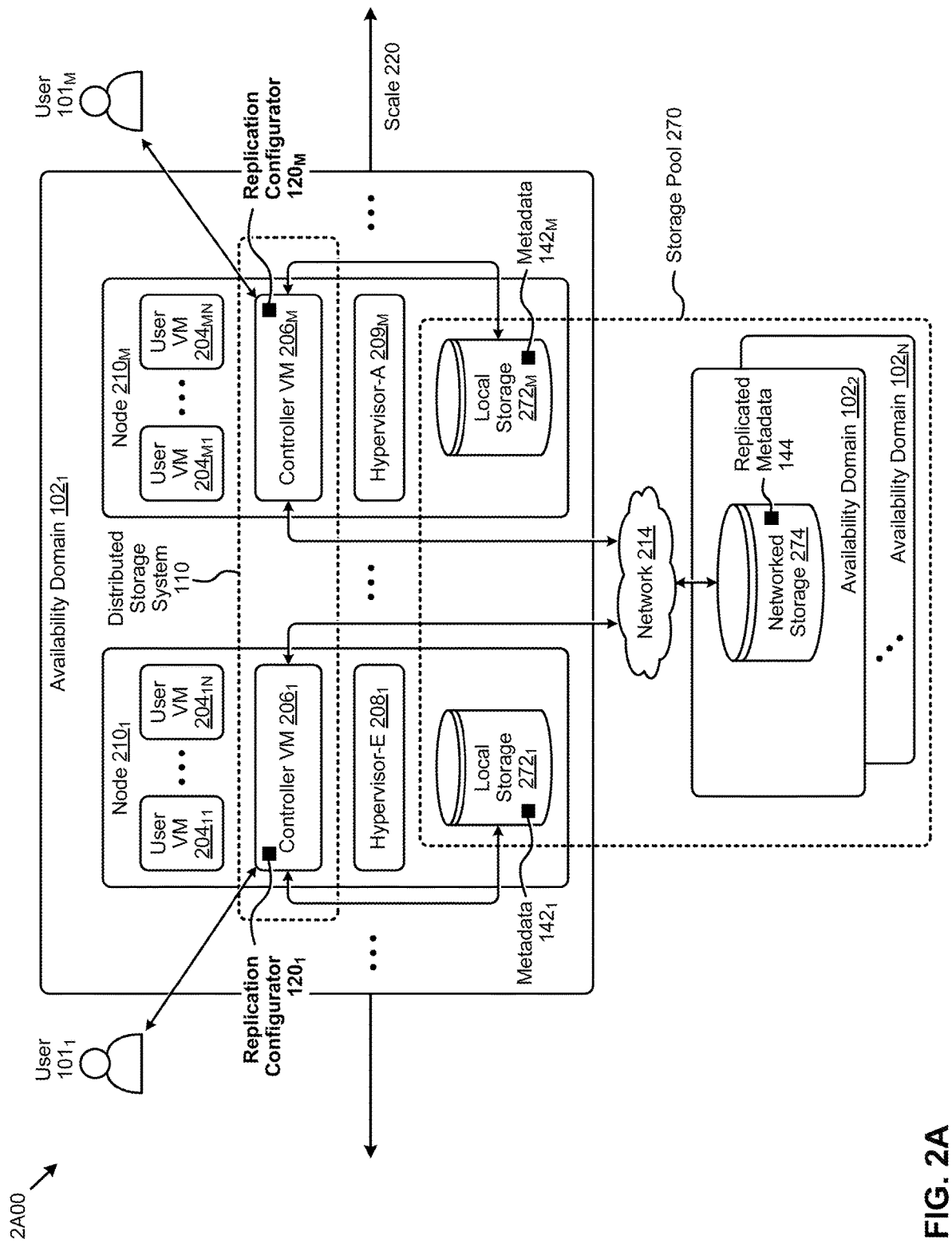
FIG. 2A presents an environment in which embodiments of the present disclosure can operate.

FIG. 2A presents an environment 2A00 in which embodiments of the present disclosure can operate. As an option, one or more variations of environment 2A00 or any aspect thereof may be implemented in the context of the architecture and functionality of the embodiments described herein.

The environment 2A00 shows various components associated with a highly scalable distributed computing and storage system that observes availability domain boundaries. Specifically, the environment 2A00 depicts one embodiment of a distributed storage system 110 associated with multiple availability domains (e.g., availability domain $102_1$, availability domain $102_2$, ..., availability domain $102_N$) in which availability domain aware replication policies can be implemented according to the herein disclosed techniques. Specifically, the environment 2A00 can comprise multiple nodes (e.g., node $210_1$, ..., node $210_M$) that have multiple tiers of storage in a storage pool 270. For example, each node can be associated with one server, multiple servers, or portions of a server. The multiple tiers of storage can include storage that is accessible through network 214 such as a networked storage 274 (e.g., a SAN or "storage area network"). The storage pool 270 can also comprise one or more instances of local storage (e.g., local storage $272_1$, ..., local storage $272_M$) that is within or directly attached to a server and/or appliance associated with the nodes. Such local storage can include solid state drives (SSDs), hard disk drives (HDDs), and/or other storage devices.

Each node can run virtualization software that includes a hypervisor. For example, a hypervisor-E $208_1$ might correspond to software from a first vendor, and a hypervisor-A $209_M$ might correspond to software from a second vendor. Such hypervisors can manage the interactions between the underlying hardware and one or more user VMs (e.g., user VM $204_{11}$, ..., user VM $204_{1N}$, ..., user VM $204_{M1}$, ..., user VM $204_{MN}$) that run client software.

A virtualized controller (e.g., an instance of a virtual machine) can be used to manage storage and I/O (input/output or IO) activities according to some embodiments. Multiple instances of such virtualized controllers (e.g., controller VM $206_1$, ..., controller VM $206_M$) coordinate within a cluster to form the distributed storage system 110 which can, among other operations, manage the storage pool 270. Controller VMs are not formed as part of specific implementations of the hypervisors. Instead, controller VMs run as virtual machines above the hypervisors on the various servers. Since controller VMs run above the hypervisors, varying virtual machine architectures and/or hypervisors can operate with the distributed storage system 110. This architecture further facilitates efficient scaling of the distributed computing and/or storage platform (e.g., see scale 220).

In one or more embodiments, one or more instances of the replication configurator disclosed herein can be implemented in distributed storage system 110. Specifically, an instance of replication configurator $120_1$ can be implemented in controller VM $206_1$, and another instance of replication configurator $120_M$ can be implemented in controller VM $206_M$. Such instances of the replication configurator can be implemented in any node in any cluster. In some cases, the instances of the management task-scheduling engine on each node can be controlled by an elected leader instance of the replication configurator that manages the replication configurations pertaining to the nodes in a cluster. The metadata replicated according to the replication configurations generated according to the herein disclosed techniques can be stored in local storage (e.g., metadata $142_1$, ..., metadata $142_M$) and/or networked storage 274 (e.g., replicated metadata 144). In some cases, an interface can be implemented in the controller VMs to facilitate user (e.g., user $101_1$, ..., user $101_M$) interaction with the replication configurator. Other components earlier described in FIG. 1C1 and FIG. 1C2 that interact with the instances of the replication configurator can also be implemented in the environment 2A00.

The computing, storage, networking, and other resources of environment 2A00 can be configured to facilitate generation of replication configurations over hierarchical availability domains and/or over various types of replicated entities as disclosed in detail as follows.

Figure 2B:
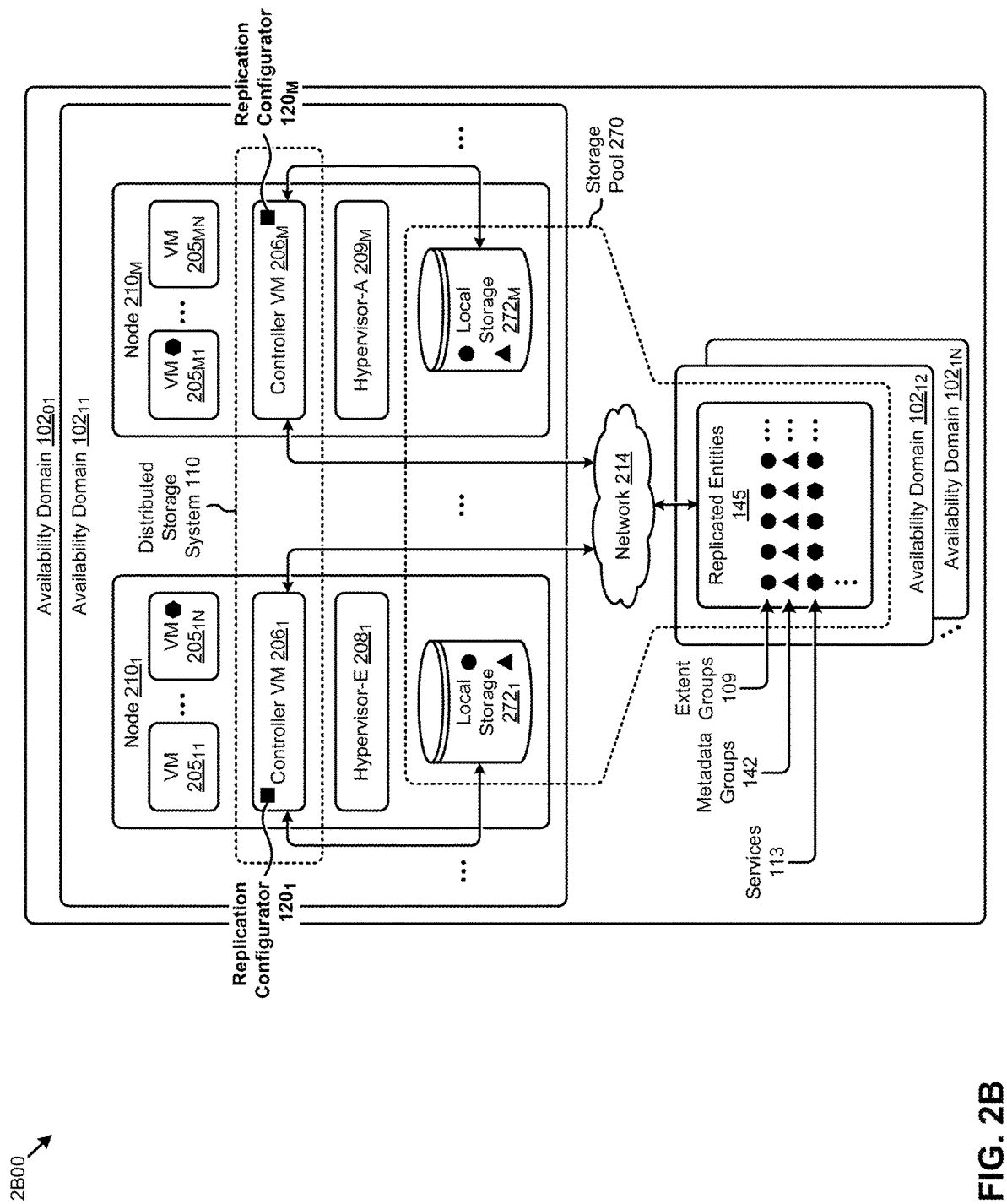
FIG. 2B illustrates a computing environment in which embodiments of the present disclosure can be implemented.

FIG. 2B illustrates a computing environment 2B00 in which embodiments of the present disclosure can be implemented. As an option, one or more variations of computing environment 2B00 or any aspect thereof may be implemented in the context of the architecture and functionality of the embodiments described herein. The computing environment 2B00 or any aspect thereof may be implemented in any environment.

FIG. 2B illustrates aspects pertaining to applying context-based node selection techniques over hierarchical availability domains to form availability domain aware replication configurations. Specifically, the figure illustrates how the herein disclosed techniques can be implemented in a hyperconverged distributed computing environment.

Computing environment 2B00 shows various components associated with a highly scalable distributed computing and storage system (e.g., hyperconverged distributed system) that observes availability domain boundaries. Specifically, computing environment 2B00 depicts distributed storage system 110 associated with multiple availability domains (e.g., availability domain $102_{01}$, availability domain $102_{11}$, availability domain $102_{12}$, ..., availability domain $102_{1N}$) in which availability domain aware replication policies can be implemented according to the herein disclosed techniques. Moreover, the foregoing domains are hierarchically related. For example, a first set of availability domains (e.g., availability domain $102_{11}$, availability domain $102_{12}$, ..., availability domain $102_{1N}$) at a first (e.g., child) availability domain level is fully contained within one or more availability domains (e.g., availability domain $102_{01}$) at a second (e.g., parent) availability domain level.

As shown, availability domain $102_{11}$ comprises multiple nodes (e.g., node $210_1$, ..., node $210_M$) that have multiple tiers of storage in a storage pool 270. For example, each node can be associated with one server, multiple servers, or portions of a server. The multiple tiers of storage can include storage that is accessible through network 214 such as a networked storage (e.g., a SAN or "storage area network"). Storage pool 270 can also comprise one or more instances of local storage (e.g., local storage $272_1$, ..., local storage $272_M$) that is within or directly attached to a server and/or appliance associated with the nodes. Such local storage can include solid state drives (SSDs), hard disk drives (HDDs), and/or other storage devices.

Each node can run virtualization software. For example, hypervisor-E $208_1$ might correspond to software from a first vendor, and hypervisor-A $209_M$ might correspond to software from a second vendor. Such hypervisors can manage the interactions between the underlying hardware and one or more VMs (e.g., VM $205_{11}$, ..., VM $205_{1N}$, ..., VM $205_{M1}$, ..., VM $205_{MN}$) that are configured to run one or more workloads.

A virtualized controller (e.g., an instance of a virtual machine) can be used to manage storage and I/O activities according to some embodiments. Multiple instances of such virtualized controllers (e.g., controller VM $206_1$, ..., controller VM $206_M$) coordinate within a cluster to form the distributed storage system 110 which can, among other operations, manage the storage pool 270. Controller VMs are not formed as part of specific implementations of the hypervisors. Instead, controller VMs run as virtual machines above the hypervisors on the various servers. Since controller VMs run above the hypervisors, varying virtual machine architectures and/or hypervisors can operate within computing environment 2B00. This architecture further facilitates efficient scaling of the distributed computing and/or storage platform.

In the shown embodiment, one or more instances of the replication configurator disclosed herein can be implemented in computing environment 2B00. Specifically, replication configurator $120_1$ can be implemented in controller VM $206_1$, and replication configurator $120_M$ can be implemented in controller VM $206_M$. Such instances of the replication configurator can be implemented in any node in any cluster. In some cases, an elected leader instance of the replication configurator can manage the replication configurations pertaining to the entities replicated over the nodes in a cluster. The entities replicated—subject to the replication configurations generated according to the herein disclosed techniques—can be stored in local storage (e.g., local storage $272_1$, ... , local storage $272_M$), networked storage, and/or instantiated at various virtualized entities (e.g., VM $205_{1N}$, ... , VM $205_{M1}$).

A set of replicated entities 145 (e.g., metadata groups 142, extent groups 109, services 113, etc.) are distributed over storage pool 270 in accordance their respective replication configurations. In some cases, an interface can be implemented in the controller VMs to facilitate user interaction with the replication configurator. Other components earlier described in FIG. 1C1 and FIG. 1C2 that interact with the instances of the replication configurator can also be implemented in computing environment 2B00.

As earlier described, various selection techniques to facilitate selection of an availability domain aware replication configuration can be implemented according to the herein disclosed techniques. One embodiment of a selection technique is shown and described as pertains to FIG. 3A.

Figure 3A:
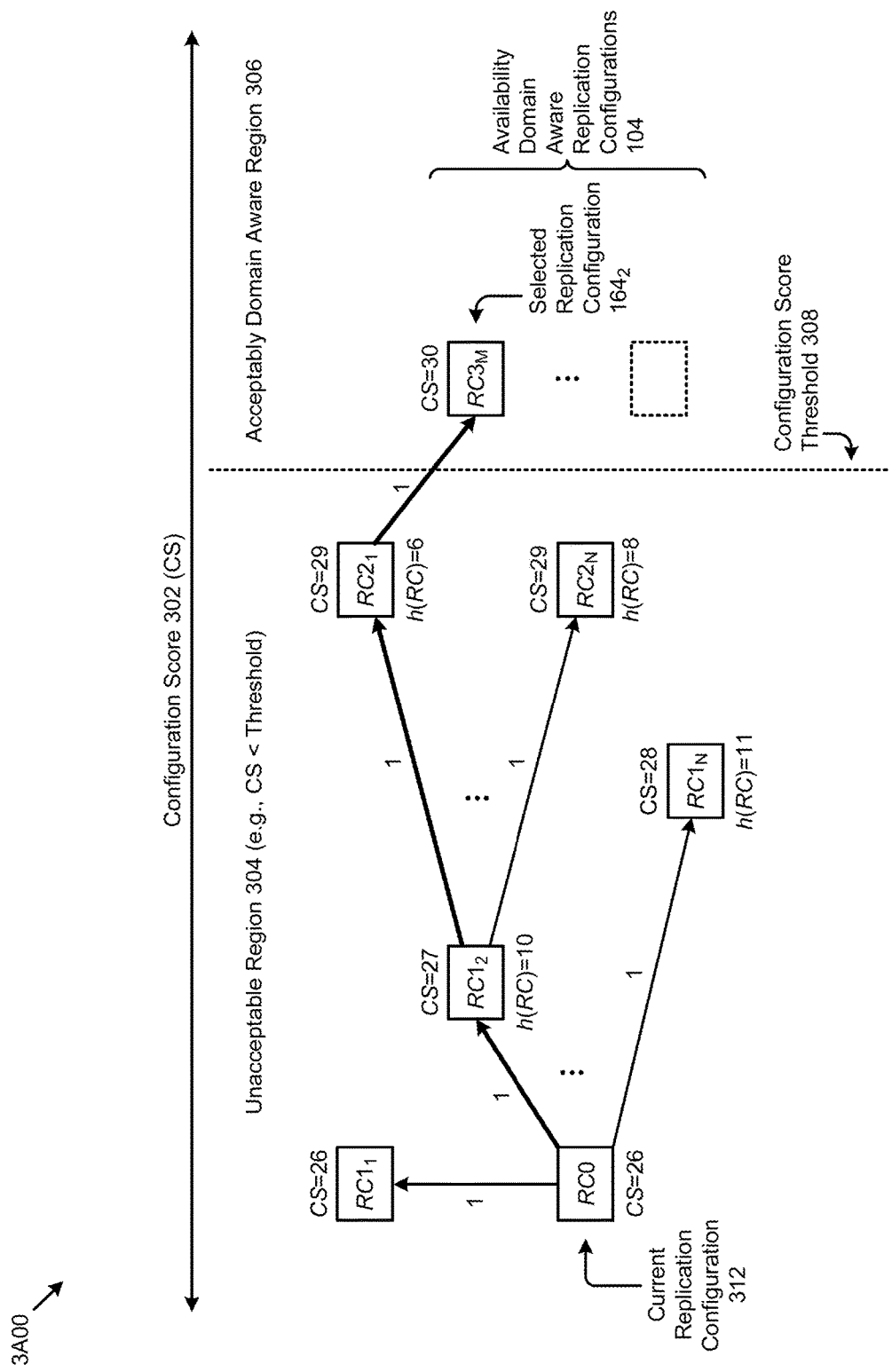
FIG. 3A presents a heuristics-based informed search technique as implemented in systems for efficiently implementing availability domain aware replication policies in distributed storage platforms, according to an embodiment.

FIG. 3A presents a heuristics-based informed search technique 3A00 as implemented in systems for efficiently implementing availability domain aware replication policies in distributed storage platforms. As an option, one or more variations of heuristics-based informed search technique 3A00 or any aspect thereof may be implemented in the context of the architecture and functionality of the embodiments described herein. The heuristics-based informed search technique 3A00 or any aspect thereof may be implemented in any environment.

The heuristics-based informed search technique 3A00 shown in FIG. 3A represents one embodiment of a technique for selecting an availability domain aware replication configuration. Specifically, the heuristics-based informed search technique 3A00 can graphically represent the implementation of an A* search algorithm with a heuristic function that operates on a given replication configuration (e.g., h(RC)). The framework for this graphical representation comprises a range associated with a configuration score 302 divided into an unacceptable configuration region 304 that includes various replication configurations with configuration scores less than configuration score threshold 308 (e.g., CST), and an acceptably domain aware region 306 that includes various replication configurations with configuration scores greater than or equal to the CST. For the scenario shown in FIG. 3A, a ring structure comprising 15 ring nodes (e.g., N=15) with a replication factor of three (e.g., RF=3) is considered. In this case, according to EQ. 1, CST is 30. As shown, a current replication configuration 312 (e.g., RC0) might have a configuration score of 26 (e.g., CS=26). Since CS is less than CST, RC0 is in the unacceptable configuration region 304, which can precipitate the selection of an availability domain aware replication configuration. Specifically, the heuristics-based informed search technique 3A00 can be implemented to efficiently and optimally select one of the one or more possible instances of availability domain aware replication configurations 104.

More specifically, the heuristics-based informed search technique 3A00 can implement at least in part an A* search algorithm to search all paths from RC0 to one of the availability domain aware replication configurations 104 to determine the path corresponding to the lowest cost. For the implementation described herein, such costs might be associated with a number of changed ring node positions, a number of computations associated with the generation of the neighboring replication configurations, and/or other metrics. In some cases, the heuristics-based informed search technique 3A00 might consider paths that can most quickly reach the goal in each iteration of the algorithm so as to, at least in part, facilitate an optimal search result.

For example, a set of neighboring replication configurations comprising merely one changed ring node position as compared to current replication configuration 312 might be considered in each search iteration. Such "one-move" configurations in iteration "1" are represented in FIG. 3A as RC11 (with CS=26), RC12 (with CS=27), and RC1N (with CS=29). The "one-move" attribute of the neighboring replication configurations can be indicated by a weighting of "1" on the edge (e.g., partial path) connecting the neighboring replication configuration to RC0.

The heuristics-based informed search technique 3A00 can determine which of the available paths to take towards the goal based at least in part on a heuristic function and/or other metrics. Specifically, the heuristics-based informed search technique 3A00 might associate an efficiency metric with each of the partial paths based at least in part on the configuration score of the respective neighboring replication configuration. For example, RC11 might have a CS of 26, which is below the CS of RC12 and RC1N (e.g., 27 and 28, respectively). In this case, the partial path through RC11 might be excluded as an inefficient path to the goal. A selected partial path from the remaining partial paths can be determined based at least in part on an estimate of the remaining cost to reach the goal from a particular selected partial path. In some cases, the remaining cost can be referred to as a transition score. According to the herein disclosed techniques, a heuristic function can be used to indicate the transition score. Specifically, in some embodiments, the heuristic function for a given replication configuration (RC) implemented herein can be represented as shown in EQ. 2 below.

$$h(RC)=(CST-CS)+(N-MCN) \qquad \text{(EQ. 2)}$$

Referring again to FIG. 3A, the transition score of RC12 (e.g., h(RC)=10) is less than the transition score of RC1N (e.g., h(RC)=11). In this case, the partial path to RC12 will be selected by the algorithm. A second iteration (e.g., iteration "2") of the algorithm produces partial paths to RC21 through RC2N. Applying the foregoing techniques, the partial path to RC21 can be selected. Since RC21 is in the unacceptable configuration region 304, more iterations can be executed. A third iteration (e.g., iteration "3") produces a neighboring replication configuration RC3M that exhibits a configuration score equal to configuration score threshold 308 (e.g., CS=30). As such, RC3M can be selected as the selected replication configuration $164_2$.

The heuristic function specified in EQ. 2 can be characterized as a non-admissible heuristic function. Such non-admissible heuristic functions may not provide an optimal solution, however such non-admissible heuristic functions can be implemented for its efficiency aspects pertaining to ring structures with a large number of ring nodes. In some cases, the shortest path to the goal might be discovered when the heuristic function is characterized as admissible. Such admissible heuristic functions can underestimate the actual cost to reach a particular goal. An admissible heuristic function might be implemented for ring structures with a low number of ring nodes. An example of an admissible heuristic function that can be implemented using the herein disclosed techniques is shown in EQ. 3.

$$h(RC)=(CST-CS)/(2+3\cdot(RF-1)) \quad \text{(EQ. 3)}$$

The shown EQ. 3 is merely one example of an admissible heuristic function. Other admissible functions that evaluate or estimate of the number of remaining moves needed to achieve a block aware configuration can be used. Various applications of such admissible heuristic functions serve to optimize the number of moves that would in turn serve to minimize the impact to the ring configuration and to minimize the cost to achieve block awareness. Strictly as one possible application, a heuristic function might calculate a set of maximum improvement scores achieved by respective moves and then estimate the number of remaining moves by dividing the difference in the calculated scores by the maximum improvement. This approach renders a conservative approximation of the minimum number of moves to reach a block aware configuration. As such, this approach yields an underestimation of the actual cost (e.g., moves to undertake) in order to reach the goal of a block aware configuration. Such an approach (e.g., using an admissible function) can be used in many possible flows for selecting replication configurations.

Figure 3B:
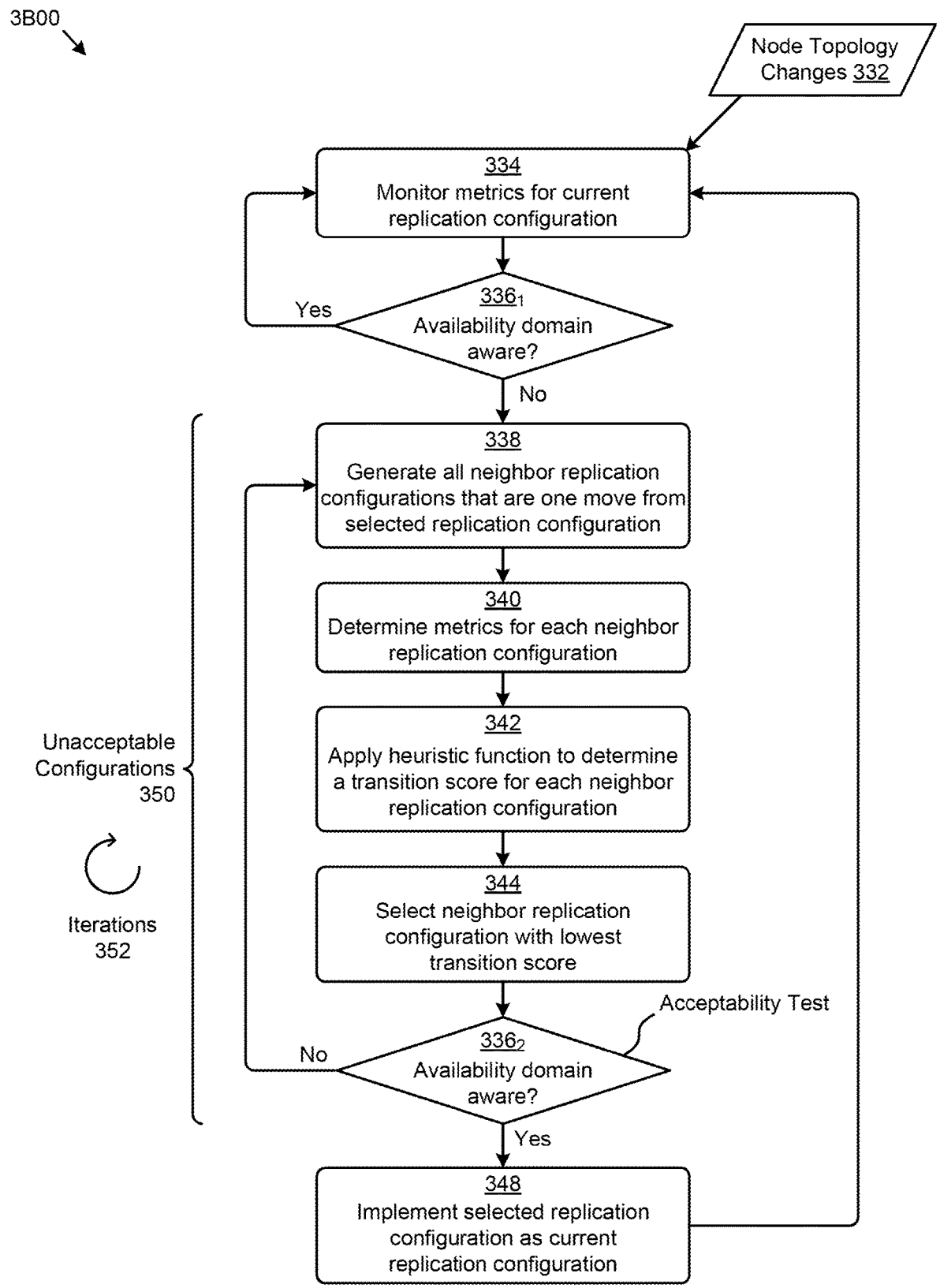
FIG. 3B presents a replication configuration selection flow technique as implemented in systems for efficiently implementing availability domain aware replication policies in distributed storage platforms, according to an embodiment.

One embodiment of a flow for selecting an availability domain aware replication configuration according to the herein disclosed techniques is shown and described as pertains to FIG. 3B.

FIG. 3B presents a replication configuration selection flow technique 3B00 as implemented in systems for efficiently implementing availability domain aware replication policies in distributed storage platforms. As an option, one or more variations of replication configuration selection flow technique 3B00 or any aspect thereof may be implemented in the context of the architecture and functionality of the embodiments described herein. The replication configuration selection flow technique 3B00 or any aspect thereof may be implemented in any environment.

The replication configuration selection flow technique 3B00 presents one embodiment of certain steps and/or operations for facilitating replication configuration selection when efficiently implementing availability domain aware replication policies in distributed storage platforms according to the herein disclosed techniques. In one or more embodiments, the steps and underlying operations comprising the replication configuration selection flow technique 3B00 can be executed by an instance of replication configurator $120_1$. As shown, the replication configuration selection flow technique 3B00 can monitor various metrics pertaining to the then-current replication configuration (at step 334). For example, the CS of the then-current replication configuration might indicate the replication configuration is availability domain aware (see "Yes" path of decision $336_1$). In some cases, certain instances of node topology changes 332 can precipitate a change to the then-current replication configuration such that it is availability domain unaware (see "No" path of decision $336_1$).

In this case, the then-current replication configuration can be identified as the selected replication configuration and the replication configuration selection flow technique 3B00 can enter a group of steps and underlying operations that will loop through one or more iterations (e.g., iterations 352) while the considered replication configurations are unacceptable (see grouping 350). Specifically, in certain embodiments, a set of neighbor replication configurations that are one move from the selected replication configuration can be generated (at step 338). Metrics (e.g., partial path weights, configuration scores, etc.) for each of the neighbor replication configurations can be determined (at step 340). In some cases, certain neighbor replication configurations might be excluded based at least in part on the metrics. For example, the neighbor replication configurations with the lowest configuration scores might be excluded. Using the foregoing metrics and/or other information, a heuristic function can be applied to each of the neighbor replication configurations to determine a transition score (at step 342).

The neighbor replication configuration with the lowest transition score can be selected as the selected replication configuration (at step 344). If the selected replication configuration is availability domain unaware (see "No" path of decision $336_2$), the loop will repeat in another iteration. If the selected replication configuration is availability domain aware (see "Yes" path of decision $336_2$), the selected replication configuration can be implemented (e.g., by a replication service) as the then-current replication configuration (at step 348).

As can be understood from the foregoing, a selected replication policy can be applied recursively, starting at the level of the target availability domain and continuing recursively to successively lower and lower availability domain levels. The resulting replication configuration will be availability domain aware not only at the highest level (e.g., at the selected target availability domain level), but also at all hierarchically lower availability domain levels. As such, if the selected target availability domain level is at the rack level, and a corresponding replication configuration is configured to be rack level aware, then the configuration will also be block level aware as well. As another example, if the selected target availability domain level is at the site level, and a corresponding replication configuration is configured to be site level aware, then the replication configuration will be rack level aware and block level aware as well.

One embodiment of a technique for context-based generation of hierarchical availability domain aware replication configurations is disclosed as follows.

Figure 3C:
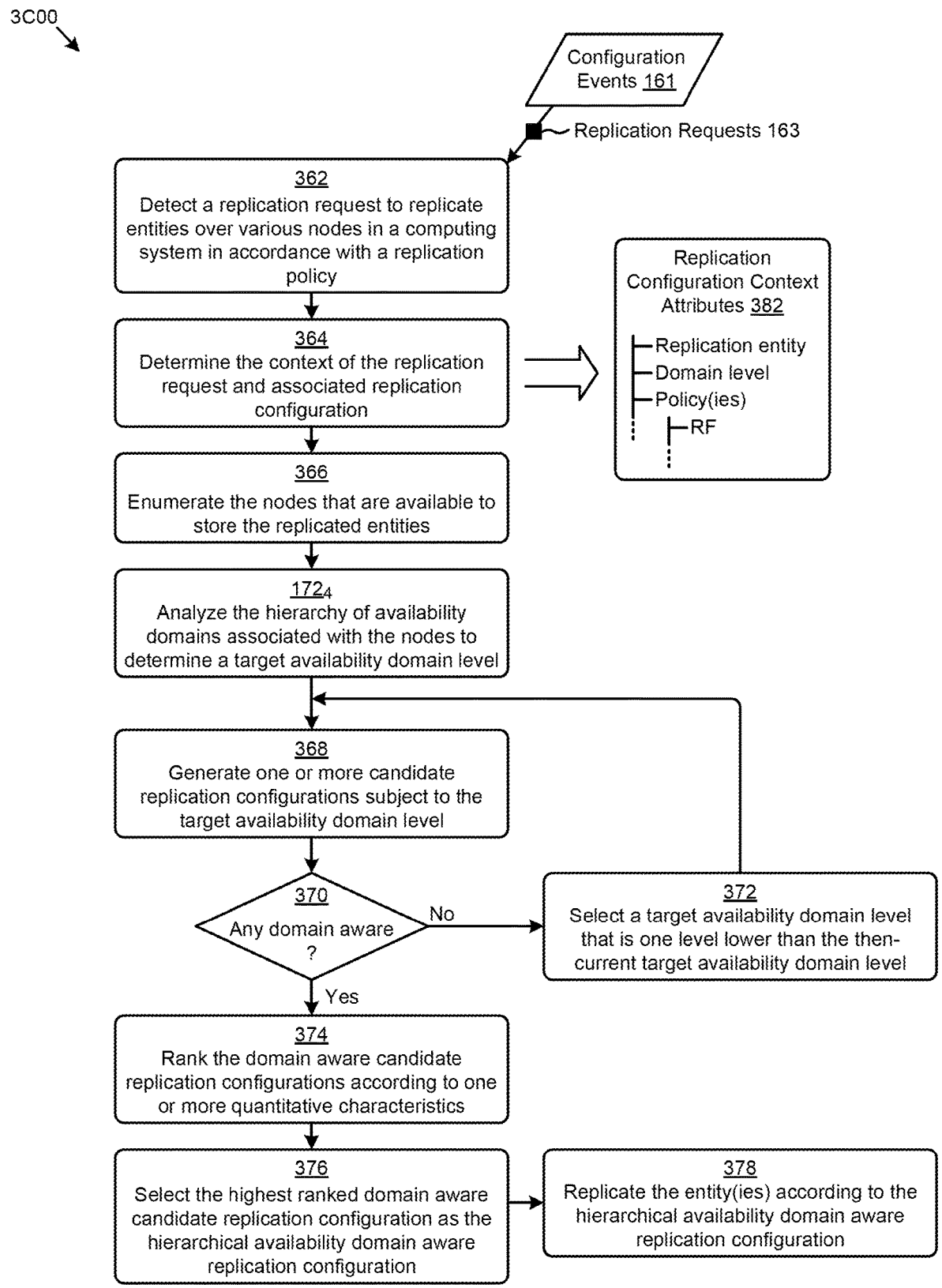
FIG. 3C presents a context-based replication configuration generation technique as applied in systems that facilitate implementing hierarchical availability domain aware replication policies in hyperconverged distributed computing environments, according to an embodiment.

FIG. 3C presents a context-based replication configuration generation technique 3C00 as applied in systems that facilitate implementing hierarchical availability domain aware replication policies in hyperconverged distributed computing environments. As an option, one or more variations of context-based replication configuration generation technique 3C00 or any aspect thereof may be implemented in the context of the architecture and functionality of the embodiments described herein. The context-based replication configuration generation technique 3C00 or any aspect thereof may be implemented in any environment.

FIG. 3C illustrates aspects pertaining to applying context-based node selection techniques over hierarchical availability domains to form availability domain aware replication configurations. Specifically, the figure is presented to illustrate one embodiment of certain steps and/or operations for context-based generation of hierarchical availability domain aware replication configurations.

Context-based replication configuration generation technique 3C00 commences by receiving a request (e.g., from replication requests 163) to replicate certain entities over various nodes in a computing system in accordance with a replication policy (step 362). As earlier described, such replication requests might be issued in response to instances of configuration events 161. In most cases, a replication configuration is required to allocate the replicas so as to comply with such replication policies. In response to receiving the request, the context of the replication request and associated replication configuration is determined (step 364). As shown in a representative set of replication configuration context attributes 382, the particular context might be characterized by a replicated entity type, a target availability domain level, a policy or set of policies, and/or other aspects associated with the replication request and/or replication configuration. The nodes of the computing system that are capable of storing the replicas are enumerated (step 366).

For example, certain nodes might be designated for purposes other than storing replicas, or for example, certain nodes might not have sufficient capacity and/or functionality for storing the replicas. The hierarchy of availability domains associated with the nodes is analyzed to determine a target availability domain level (step $172_4$). As an example, for a replication policy that defines a replication factor of five (e.g., RF=5), the highest availability domain level associated with the hierarchy of availability domains that has at least five availability domains might be selected as the target availability domain level.

When the target availability domain level is determined, one or more candidate replication configurations are generated subject to the target availability domain level (step 368). Specifically, the candidate replication configurations might be configurations that are characterized as availability domain aware at the target availability domain level. If no availability aware candidate replication configurations are discovered at the target availability domain aware level ("No" path of decision 370), a target availability domain level that is one level lower than the then-current target availability domain level is selected (step 372), and the candidate replication configuration generation operation (step 368) is repeated at the new target availability domain level. The configuration generation selection and level adjustment operations are repeated until at least one availability domain aware candidate replication configuration is discovered.

When at least one availability domain aware candidate replication configuration is discovered ("Yes" path of decision 370), the domain aware candidate replication configurations are ranked according to one or more quantitative characteristics (step 374). For example, the domain aware candidate replication configurations might be ranked in accordance with respective quantitative representations of a fault tolerance, a replication factor, a configuration score, a node score, a maximum consecutive node score, a transition score, a block aware score, a rack aware score, a heuristic function, and/or other characteristics of the configurations. The highest ranked domain aware candidate replication configuration is then selected as the hierarchical availability domain aware replication configuration to be accessed to process the replication request (step 376). As such, the entity or entities associated with the replication request are replicated over the nodes of the computing system in accordance with the hierarchical availability domain aware replication configuration (step 378).

Additional Embodiments of the Disclosure

Additional Practical Application Examples

Figure 4A:
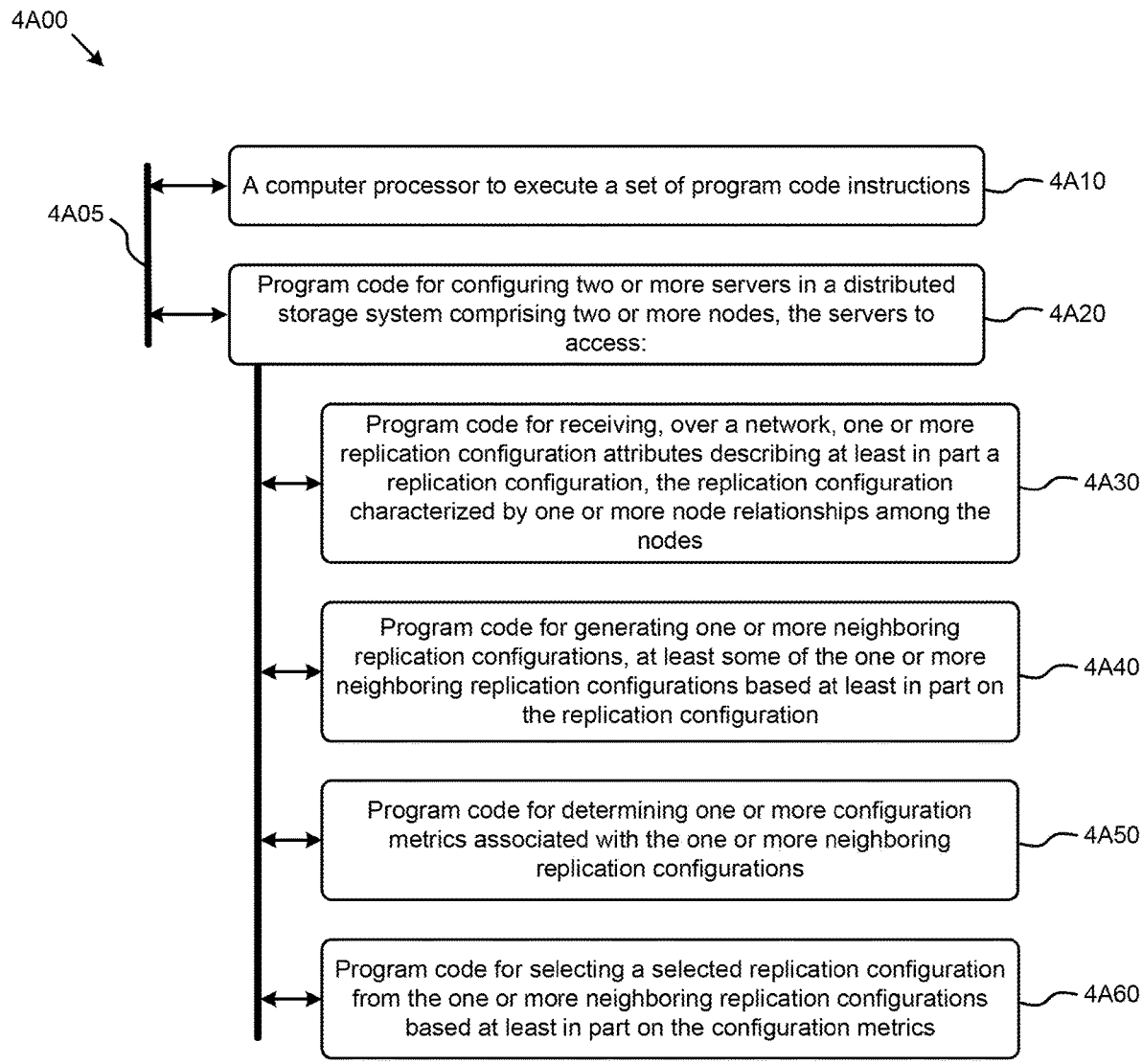
FIG. 4A, FIG. 4B, FIG. 4C, FIG. 4D, and FIG. 4E depict system components as arrangements of computing modules that are interconnected so as to implement certain of the herein-disclosed embodiments.

FIG. 4A depicts a system 4A00 as an arrangement of computing modules that are interconnected so as to operate cooperatively to implement certain of the herein-disclosed embodiments. The partitioning of system 4A00 is merely illustrative and other partitions are possible. As an option, the system 4A00 may be implemented in the context of the architecture and functionality of the embodiments described herein. Of course, however, the system 4A00 or any operation therein may be carried out in any desired environment.

The system 4A00 comprises at least one processor and at least one memory, the memory serving to store program instructions corresponding to the operations of the system. As shown, an operation can be implemented in whole or in part using program instructions accessible by a module. The modules are connected to a communication path 4A05, and any operation can communicate with other operations over communication path 4A05. The modules of the system can, individually or in combination, perform method operations within system 4A00. Any operations performed within system 4A00 may be performed in any order unless as may be specified in the claims.

The shown embodiment implements a portion of a computer system, presented as system 4A00, comprising a computer processor to execute a set of program code instructions (module 4A10) and modules for accessing memory to hold program code instructions to perform: configuring two or more servers in a distributed storage system comprising two or more nodes, the servers to perform operations (module 4A20) comprising: receiving, over a network, one or more replication configuration attributes describing at least in part a replication configuration, the replication configuration characterized by one or more node relationships among the nodes (module 4A30); generating one or more neighboring replication configurations, at least some of the one or more neighboring replication configurations based at least in part on the existing replication configuration (module 4A40); determining one or more configuration metrics associated with the one or more neighboring replication configurations (module 4A50); and selecting a selected replication configuration from the one or more neighboring replication configurations based at least in part on the configuration metrics (module 4A60).

Variations of the foregoing may include more or fewer of the shown modules and variations may perform more or fewer (or different) steps, and/or may use data elements in more, or in fewer or different operations.

Some embodiments include variations comprising steps for receiving, over a network, one or more node topology attributes describing at least in part one or more availability domains in the distributed storage system, the availability domains associated with a respective portion of the nodes, and the selected replication configuration is selected based at least in part on the availability domains.

Some embodiments include variations where the acts of receiving at least one of the replication configuration attributes, or the node topology attributes, is responsive to one or more node topology changes.

Some embodiments include variations where the node topology attributes comprise at least one of, a node identifier, an availability domain identifier, a site identifier, a host identifier, an IP address, or a node state.

Some embodiments include variations where at least one of, the replication configuration, one or more neighboring replication configurations, or the selected replication configuration, comprise a ring structure.

Some embodiments include variations where at least two of, the replication configuration, one or more neighboring replication configurations, or the selected replication configuration, differ by at least one changed node position.

Some embodiments include variations where the ring nodes of the selected replication configuration associated with an availability domain are separated in the ring structure by a number of ring nodes equal to a replication factor minus one.

Some embodiments include variations where the configuration metrics are based at least in part on at least one of, a replication factor, a configuration score, a node score, a maximum consecutive node score, a transition score, a block aware score, a rack aware score, or a heuristic function.

Some embodiments include variations where the heuristic function is at least one of, an admissible heuristic function, or a non-admissible heuristic function.

Some embodiments include variations where the selected replication configuration is selected based at least in part on an informed search algorithm.

Some embodiments include variations where the informed search algorithm comprises at least one of, an A* search algorithm, a breadth first search algorithm, a best first search algorithm, a greedy approach, or a pruning technique.

Some embodiments include variations where the replication configuration attributes comprise at least one of, a node identifier, a token identifier, an IP address, a data center, a rack identifier, a predecessor node identifier, or a successor node identifier.

Some embodiments include variations where the attributes describe at least in part a replication configuration, the replication configuration characterized by one or more node relationships among the nodes.

Some embodiments include variations further comprising steps for accessing one or more servers in a distributed storage system comprising one or more nodes.

Some embodiments include variations further comprising steps generating one or more neighboring replication configurations, at least some of the one or more neighboring replication configurations based at least in part on the replication configuration.

Some embodiments include variations further comprising steps determining one or more configuration metrics associated with the one or more neighboring replication configurations.

Some embodiments include variations further comprising steps selecting a selected replication configuration from the one or more neighboring replication configurations based at least in part on the configuration metrics.

Figure 4B:
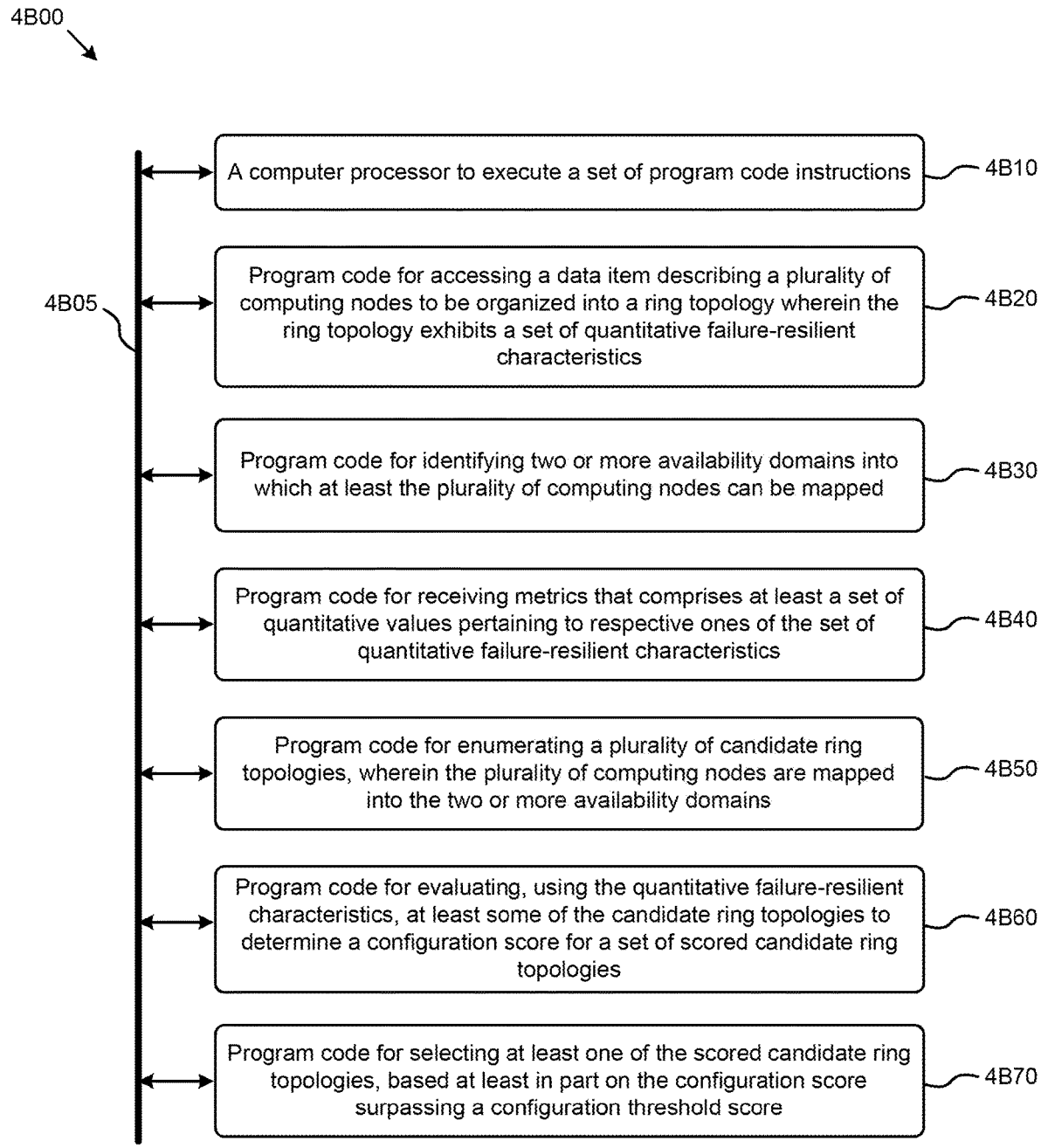

FIG. 4B depicts a system 4B00 as an arrangement of computing modules that are interconnected so as to operate cooperatively to implement certain of the herein-disclosed embodiments. The partitioning of system 4B00 is merely illustrative and other partitions are possible. As an option, the system 4B00 may be implemented in the context of the architecture and functionality of the embodiments described herein. Of course, however, the system 4B00 or any operation therein may be carried out in any desired environment.

The system 4B00 comprises at least one processor and at least one memory, the memory serving to store program instructions corresponding to the operations of the system. As shown, an operation can be implemented in whole or in part using program instructions accessible by a module. The modules are connected to a communication path 4B05, and any operation can communicate with other operations over communication path 4B05. The modules of the system can, individually or in combination, perform method operations within system 4B00. Any operations performed within system 4B00 may be performed in any order unless as may be specified in the claims.

The shown embodiment implements a portion of a computer system, presented as system 4B00, comprising a computer processor to execute a set of program code instructions (module 4B10) and modules for accessing memory to hold program code instructions to perform: accessing a data item describing a plurality of computing nodes to be organized into a ring topology wherein the ring topology exhibits a set of quantitative failure-resilient characteristics (module 4B20); identifying two or more availability domains into which at least the plurality of computing nodes can be mapped (module 4B30); receiving metrics that comprises at least a set of quantitative values pertaining to respective ones of the set of quantitative failure-resilient characteristics (module 4B40); enumerating a plurality of candidate ring topologies, wherein the plurality of computing nodes are mapped into the two or more availability domains (module 4B50); evaluating, using the quantitative failure-resilient characteristics, at least some of the candidate ring topologies to determine a configuration score for a set of scored candidate ring topologies (module 4B60); and selecting at least one of the scored candidate ring topologies, based at least in part on the configuration score surpassing (e.g., being equal or greater than) a configuration threshold score (module 4B70).

Figure 4C:
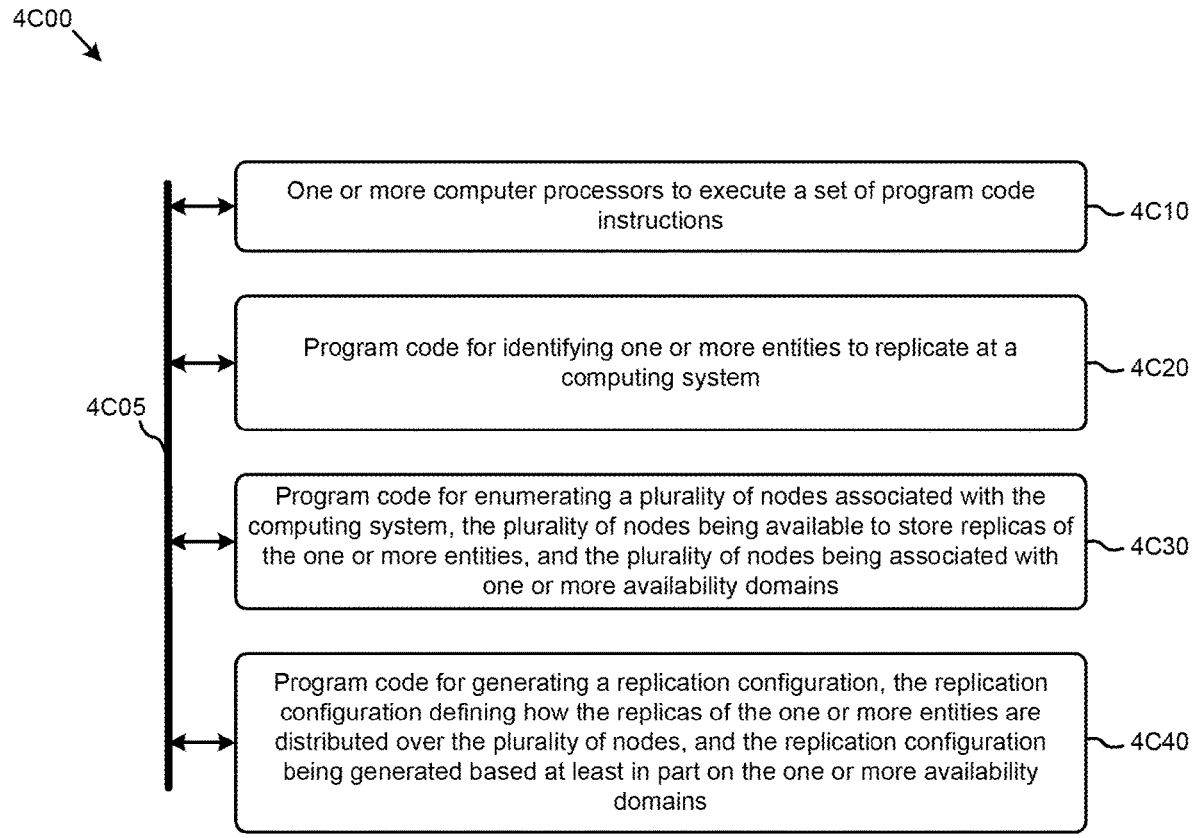

FIG. 4C depicts a system 4C00 as an arrangement of computing modules that are interconnected so as to operate cooperatively to implement certain of the herein-disclosed embodiments. This and other embodiments present particular arrangements of elements that, individually or as combined, serve to form improved technological processes that address managing the storage capacity consumed by fine-grained snapshots in hyperconverged distributed computing systems. The partitioning of system 4C00 is merely illustrative and other partitions are possible. As an option, the system 4C00 may be implemented in the context of the architecture and functionality of the embodiments described herein. Of course, however, the system 4C00 or any operation therein may be carried out in any desired environment.

The system 4C00 comprises at least one processor and at least one memory, the memory serving to store program instructions corresponding to the operations of the system. As shown, an operation can be implemented in whole or in part using program instructions accessible by a module. The modules are connected to a communication path 4C05, and any operation can communicate with any other operations over communication path 4C05. The modules of the system can, individually or in combination, perform method operations within system 4C00. Any operations performed within system 4C00 may be performed in any order unless as may be specified in the claims.

The shown embodiment implements a portion of a computer system, presented as system 4C00, comprising one or more computer processors to execute a set of program code instructions (module 4C10) and modules for accessing memory to hold program code instructions to perform: identifying one or more entities to replicate at a computing system (module 4C20); enumerating a plurality of nodes associated with the computing system, the plurality of nodes being available to store replicas of the one or more entities, and the plurality of nodes being associated with one or more availability domains (module 4C30); and generating a replication configuration, the replication configuration defining how the replicas of the one or more entities are distributed over the plurality of nodes, and the replication configuration being generated based at least in part on the one or more availability domains (module 4C40).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations. Strictly as examples, some embodiments further comprising replicating the one or more entities over the plurality of nodes in accordance with the replication configuration and/or, in some embodiments the replication configuration is characterized as being availability domain aware.

In some embodiments, the replication configuration is characterized at least in part by a set of node relationships between the plurality of nodes, the set of node relationships being based at least in part on the one or more availability domains.

In some embodiments, the one or more entities comprise at least one of, one or more sets of data, one or more sets of metadata, one or more sets of configuration data, one or more services, one or more servers, one or more applications, or one or more agents.

In some embodiments, the replication configuration is selected from a set of candidate replication configurations, and in some embodiments, the replication configuration is selected based at least in part on one or more quantitative characteristics associated with the set of candidate replication configurations.

In some embodiments, the one or more quantitative characteristics are derived at least in part from at least one of, a replication factor, a configuration score, a node score, a maximum consecutive node score, a transition score, a block aware score, a rack aware score, or a heuristic function. Some embodiments operate wherein a first availability domain is fully contained within a second availability domain.

Figure 4D:
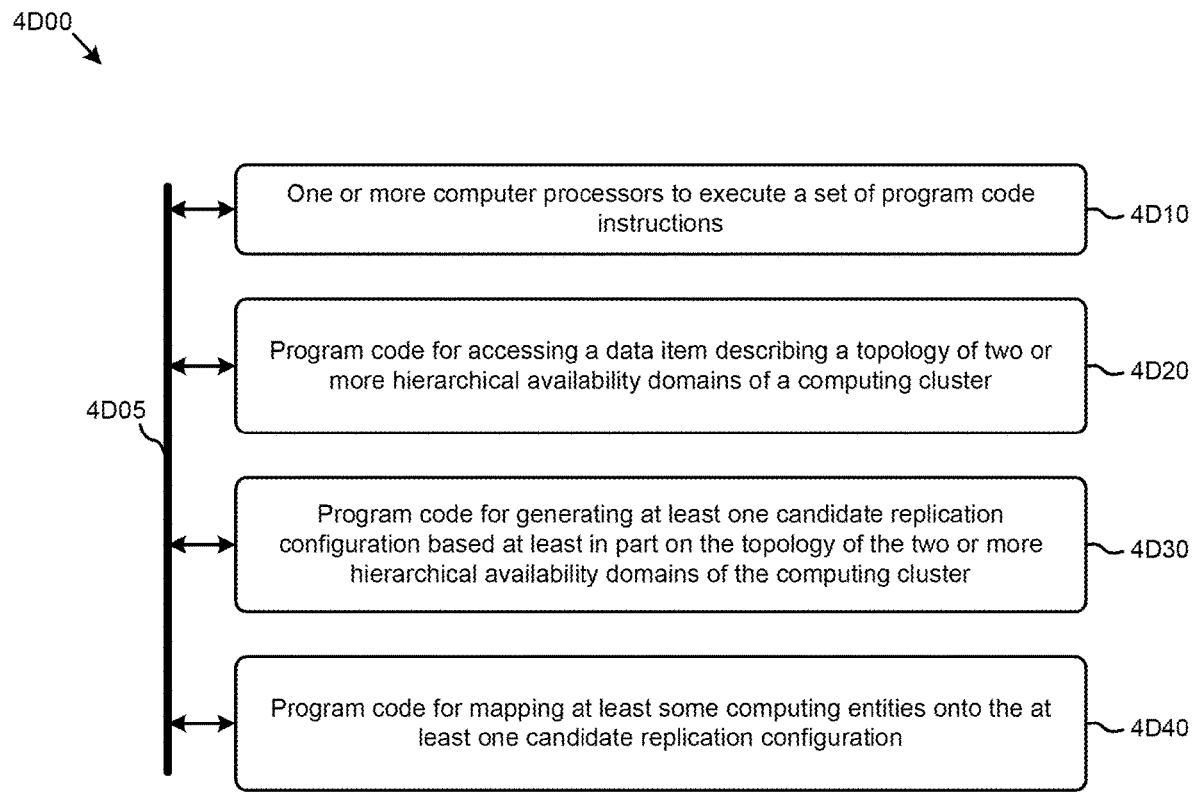

FIG. 4D depicts a system 4D00 as an arrangement of computing modules that are interconnected so as to operate cooperatively to implement certain of the herein-disclosed embodiments. The partitioning of system 4D00 is merely illustrative and other partitions are possible. As an option, the system 4D00 may be implemented in the context of the architecture and functionality of the embodiments described herein. Of course, however, the system 4D00 or any operation therein may be carried out in any desired environment. The system 4D00 comprises at least one processor and at least one memory, the memory serving to store program instructions corresponding to the operations of the system. As shown, an operation can be implemented in whole or in part using program instructions accessible by a module. The modules are connected to a communication path 4D05, and any operation can communicate with any other operations over communication path 4D05. The modules of the system can, individually or in combination, perform method operations within system 4D00. Any operations performed within system 4D00 may be performed in any order unless as may be specified in the claims. The shown embodiment implements a portion of a computer system, presented as system 4D00, comprising one or more computer processors to execute a set of program code instructions (module 4D10) and modules for accessing memory to hold program code instructions to perform: accessing a data item describing a topology of two or more hierarchical availability domains of a computing cluster (module 4D20); generating at least one candidate replication configuration based at least in part on the topology of the two or more hierarchical availability domains of the computing cluster (module 4D30); and mapping at least some computing entities onto the at least one candidate replication configuration (module 4D40). Many variations or embodiments of the foregoing are possible. Strictly as examples, some embodiments comprise generating at least one additional candidate replication configuration, and some embodiments comprise steps for evaluating the at least one additional candidate replication configuration to determine a selected replication configuration.

Some embodiments further comprise detecting a failure event that affects at least one of the nodes from within an availability domain, which in turn causes execution of steps for generating at least one further candidate replication configuration that does not include at least one of the nodes from within the availability domain that corresponds to the failure event.

In some embodiments, at least some of the computing entities comprise at least one of, a replica of a set of metadata, a portion of an extent group, or configuration services. Some embodiments include aspects wherein generating the at least one candidate replication configuration is based at least in part on at least one of, a node identifier, an availability domain identifier, a site identifier, a host identifier, an IP address, or a node state, and/or wherein the at least one candidate replication configuration comprises at least one of, a token identifier, a data center identifier, a rack identifier, a predecessor node identifier, or a successor node identifier. In some cases, the generating of the at least one candidate replication configuration is based at least in part on at least one of, a replication factor, a configuration score, a node score, a maximum consecutive node score, a transition score, a block aware score, a rack aware score, or a heuristic function.

The aforementioned hierarchical availability domains may be formed of a site and one or more racks, or a rack and one or more rackable units.

Figure 4E:
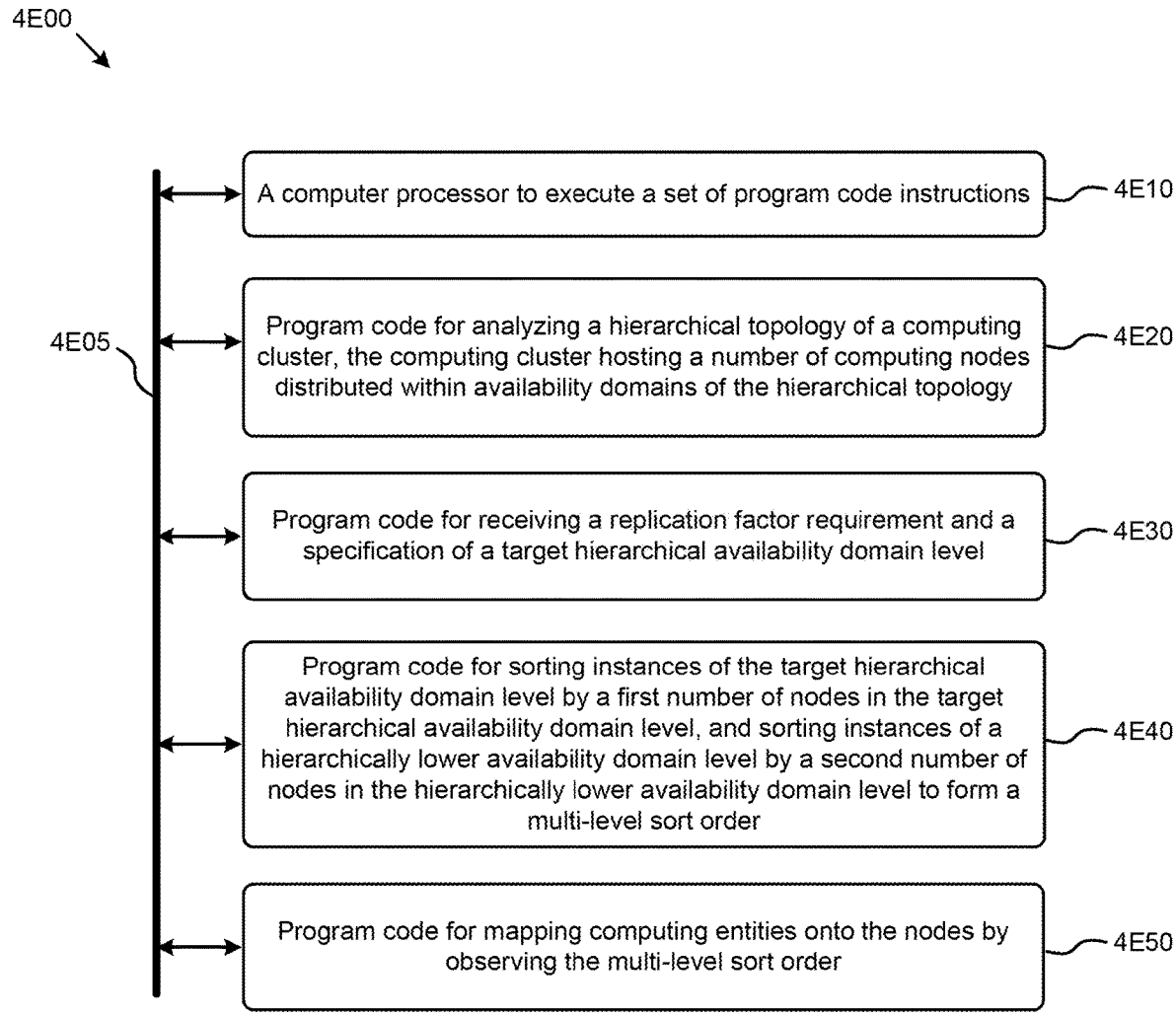

FIG. 4E depicts a system 4E00 as an arrangement of computing modules that are interconnected so as to operate cooperatively to implement certain of the herein-disclosed embodiments. The partitioning of system 4E00 is merely illustrative and other partitions are possible. As an option, the system 4E00 may be implemented in the context of the architecture and functionality of the embodiments described herein. Of course, however, the system 4E00 or any operation therein may be carried out in any desired environment. The system 4E00 comprises at least one processor and at least one memory, the memory serving to store program instructions corresponding to the operations of the system. As shown, an operation can be implemented in whole or in part using program instructions accessible by a module. The modules are connected to a communication path 4E05, and any operation can communicate with any other operations over communication path 4E05. The modules of the system can, individually or in combination, perform method operations within system 4E00. Any operations performed within system 4E00 may be performed in any order unless as may be specified in the claims. The shown embodiment implements a portion of a computer system, presented as system 4E00, comprising one or more computer processors to execute a set of program code instructions (module 4E10) and modules for accessing memory to hold program code instructions to perform: analyzing a hierarchical topology of a computing cluster, the computing cluster hosting a number of computing nodes distributed within availability domains of the hierarchical topology (module 4E20); receiving a replication factor requirement and a specification of a target hierarchical availability domain level (module 4E30); sorting instances of the target hierarchical availability domain level by a first number of nodes in the target hierarchical availability domain level, and sorting instances of a hierarchically lower availability domain level by a second number of nodes in the hierarchically lower availability domain level to form a multi-level sort order (module 4E40); and mapping computing entities onto the nodes by observing the multi-level sort order (module 4E50).

Embodiments of the foregoing results in a mapping of the computing entities onto the computing nodes where the replication factor requirement at the target hierarchical availability domain level is achieved as well as being achieved at hierarchically lower availability domain levels. Specifically, when observing the multi-level sort order, the mapping of the computing entities onto the computing nodes achieves the replication factor requirement at successively lower availability domain levels. In some embodiments, the replication factor requirement defines a number of replicas of the computing entities that are to be distributed across at least two different availability domains.

System Architecture Overview
Additional System Architecture Examples

Figure 5A:
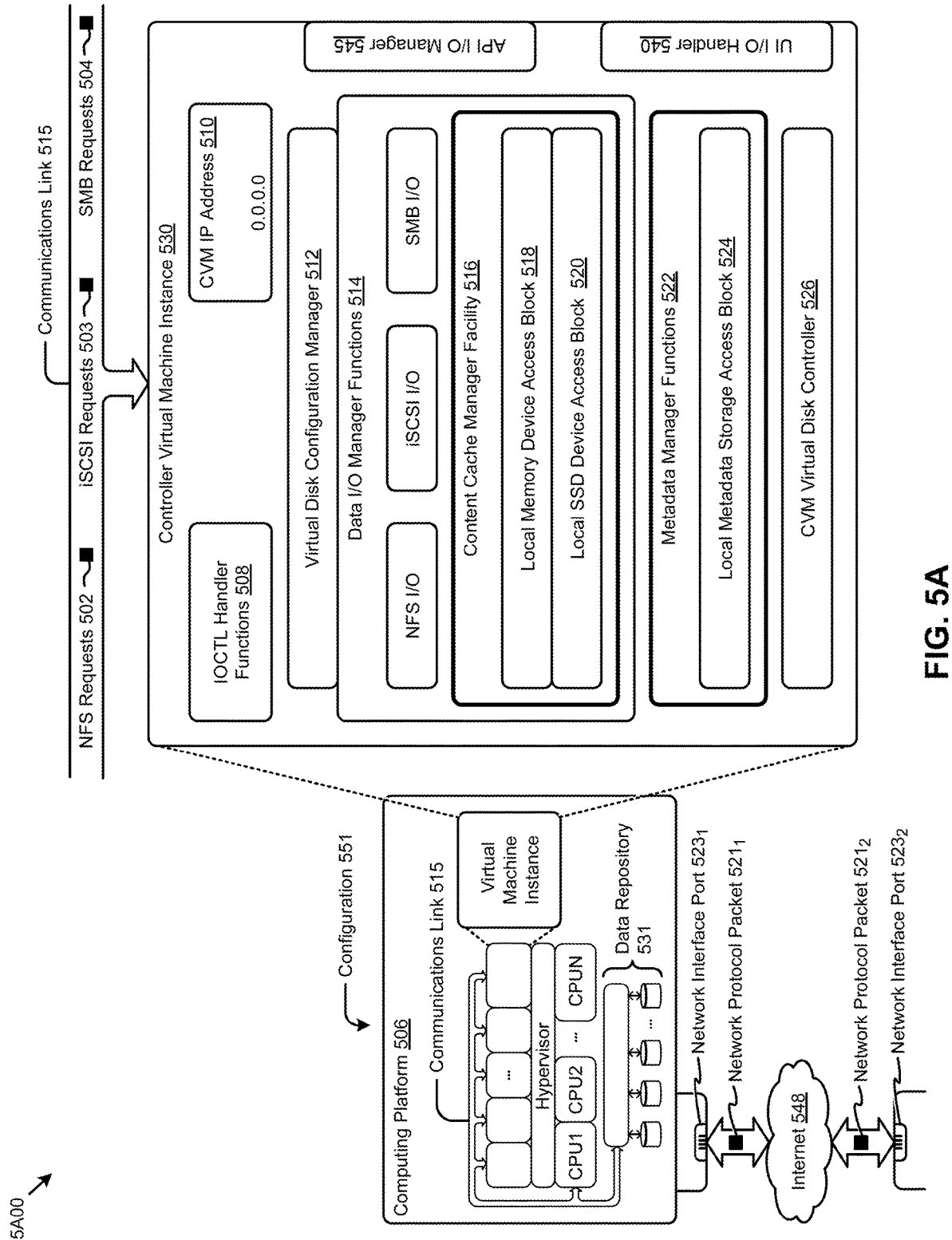
FIG. 5A, FIG. 5B, and FIG. 5C depict architectures comprising collections of interconnected components suitable for implementing embodiments of the present disclosure and/or for use in the herein-described environments.

FIG. 5A depicts a virtualized controller as implemented by the shown virtual machine architecture 5A00. The heretofore-disclosed embodiments, including variations of any virtualized controllers, can be implemented in distributed systems where a plurality of networked-connected devices communicate and coordinate actions using intercomponent messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 5A00 comprises a collection of interconnected components suitable for implementing embodiments of the present disclosure and/or for use in the herein-described environments. Moreover, virtual machine architecture 5A00 includes a virtual machine instance in configuration 551 that is further described as pertaining to controller virtual machine instance 530. Configuration 551 supports virtual machine instances that are deployed as user virtual machines or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as controller virtual machine instance 530.

In this and other configurations, a controller virtual machine instance receives block I/O storage requests as network file system (NFS) requests in the form of NFS requests 502, and/or internet small computer storage interface (iSCSI) block IO requests in the form of iSCSI requests 503, and/or Samba file system (SMB) requests in the form of SMB requests 504. The controller virtual machine (CVM) instance publishes and responds to an internet protocol (IP) address (e.g., CVM IP address 510). Various forms of input and output can be handled by one or more IO control handler functions (e.g., IOCTL handler functions 508) that interface to other functions such as data IO manager functions 514 and/or metadata manager functions 522. As shown, the data IO manager functions can include communication with virtual disk configuration manager 512 and/or can include direct or indirect communication with any of various block IO functions (e.g., NFS IO, iSCSI IO, SMB IO, etc.).

In addition to block IO functions, configuration 551 supports IO of any form (e.g., block IO, streaming IO, packet-based IO, HTTP traffic, etc.) through either or both of a user interface (UI) handler such as UI IO handler 540 and/or through any of a range of application programming interfaces (APIs), possibly through API IO manager 545.

Communications link 515 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 530 includes content cache manager facility 516 that accesses storage locations, possibly including local dynamic random access memory (DRAM) (e.g., through local memory device access block 518) and/or possibly including accesses to local solid state storage (e.g., through local SSD device access block 520).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 531, which in turn can be formatted into any one or more storage areas, and which can comprise parameterized storage accessible by a key (e.g., a filename, a table name, a block address, an offset address, etc.). Data repository 531 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 524. The data repository 531 can be configured using CVM virtual disk controller 526, which can in turn manage any number or any configuration of virtual disks.

Execution of a sequence of instructions to practice certain embodiments of the disclosure are performed by one or more instances of a software instruction processor, a processing element such as a data processor, or such as a central processing unit (e.g., CPU1, CPU2, . . . , CPUN). According to certain embodiments of the disclosure, two or more instances of configuration 551 can be coupled by communications link 515 (e.g., backplane, LAN, PSTN, wired or wireless network, etc.) and each instance may perform respective portions of sequences of instructions as may be required to practice embodiments of the disclosure.

The shown computing platform 506 is interconnected to the Internet 548 through one or more network interface ports (e.g., network interface port $523_1$ and network interface port $523_2$). Configuration 551 can be addressed through one or more network interface ports using an IP address. Any operational element within computing platform 506 can perform sending and receiving operations using any of a range of network protocols, possibly including network protocols that send and receive packets (e.g., network protocol packet $521_1$ and network protocol packet $521_2$).

Computing platform 506 may transmit and receive messages that can be composed of configuration data and/or any other forms of data and/or instructions organized into a data structure (e.g., communications packets). In some cases, the data structure includes program code instructions (e.g., application code) communicated through the Internet 548 and/or through any one or more instances of communications link 515. Received program code may be processed and/or executed by a CPU as it is received and/or program code may be stored in any volatile or non-volatile storage for later execution. Program code can be transmitted via an upload (e.g., an upload from an access device over the Internet 548 to computing platform 506). Further, program code and/or the results of executing program code can be delivered to a particular user via a download (e.g., a download from computing platform 506 over the Internet 548 to an access device).

Configuration 551 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination thereof. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to implementing hierarchical availability domain aware replication policies. In some embodiments, a module may include one or more state machines and/or combinational logic used to implement or facilitate the operational and/or performance characteristics pertaining to implementing hierarchical availability domain aware replication policies.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of implementing hierarchical availability domain aware replication policies). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to implementing hierarchical availability domain aware replication policies, and/or for improving the way data is manipulated when performing computerized operations to implement hierarchical availability domain aware replication policies.

Further details regarding general approaches to storing and retrieving data are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 5B:
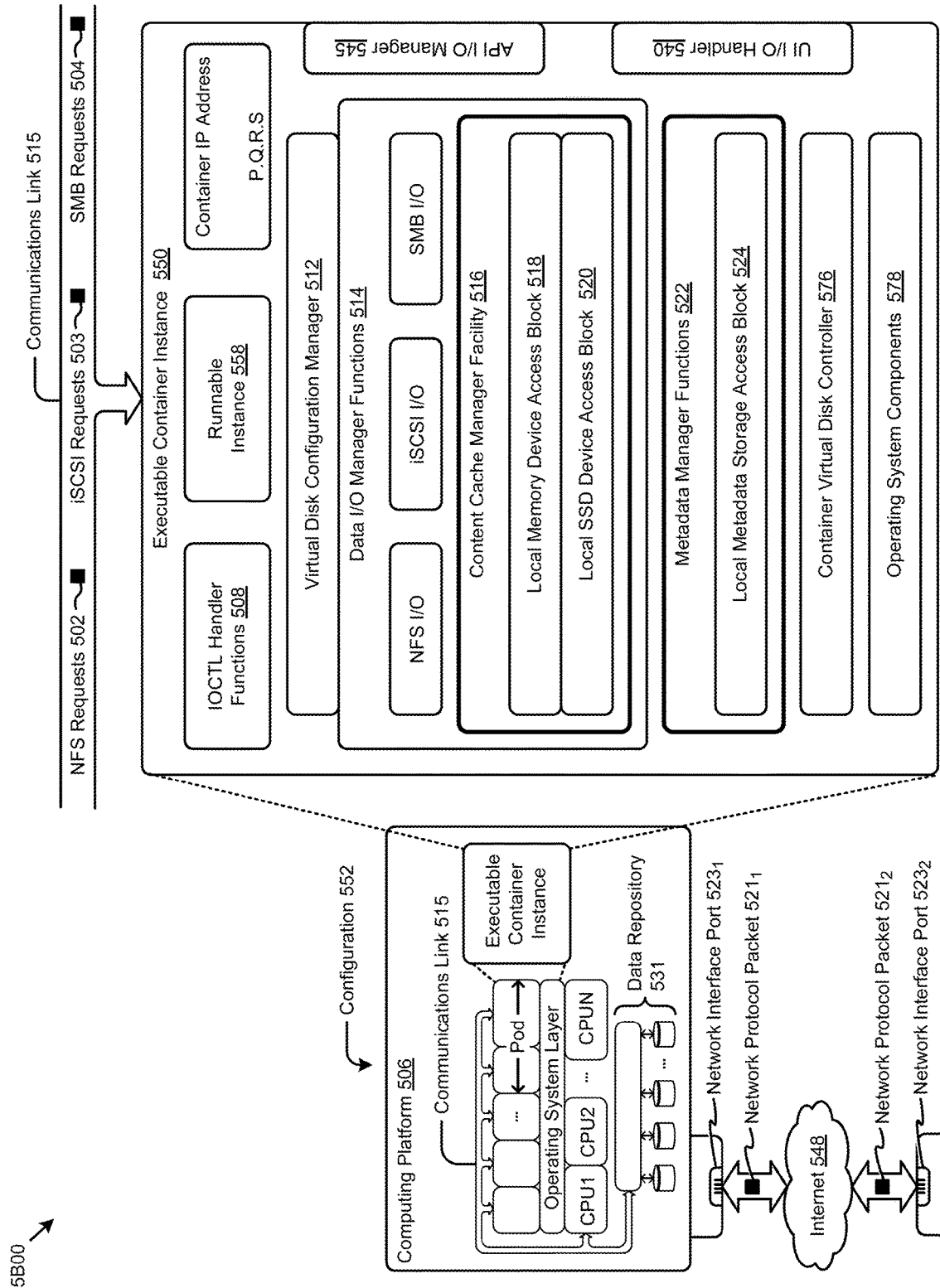

FIG. 5B depicts a virtualized controller implemented by containerized architecture 5B00. The containerized architecture comprises a collection of interconnected components suitable for implementing embodiments of the present disclosure and/or for use in the herein-described environments. Moreover, the shown containerized architecture 5B00 includes an executable container instance in configuration 552 that is further described as pertaining to executable container instance 550. Configuration 552 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions.

In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 550). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 578, however such a separate set of operating system components need not be provided. As an alternative, an executable container can include runnable instance 558, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 576. Such a container virtual disk controller can perform any of the functions that the aforementioned CVM virtual disk controller 526 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 5C:
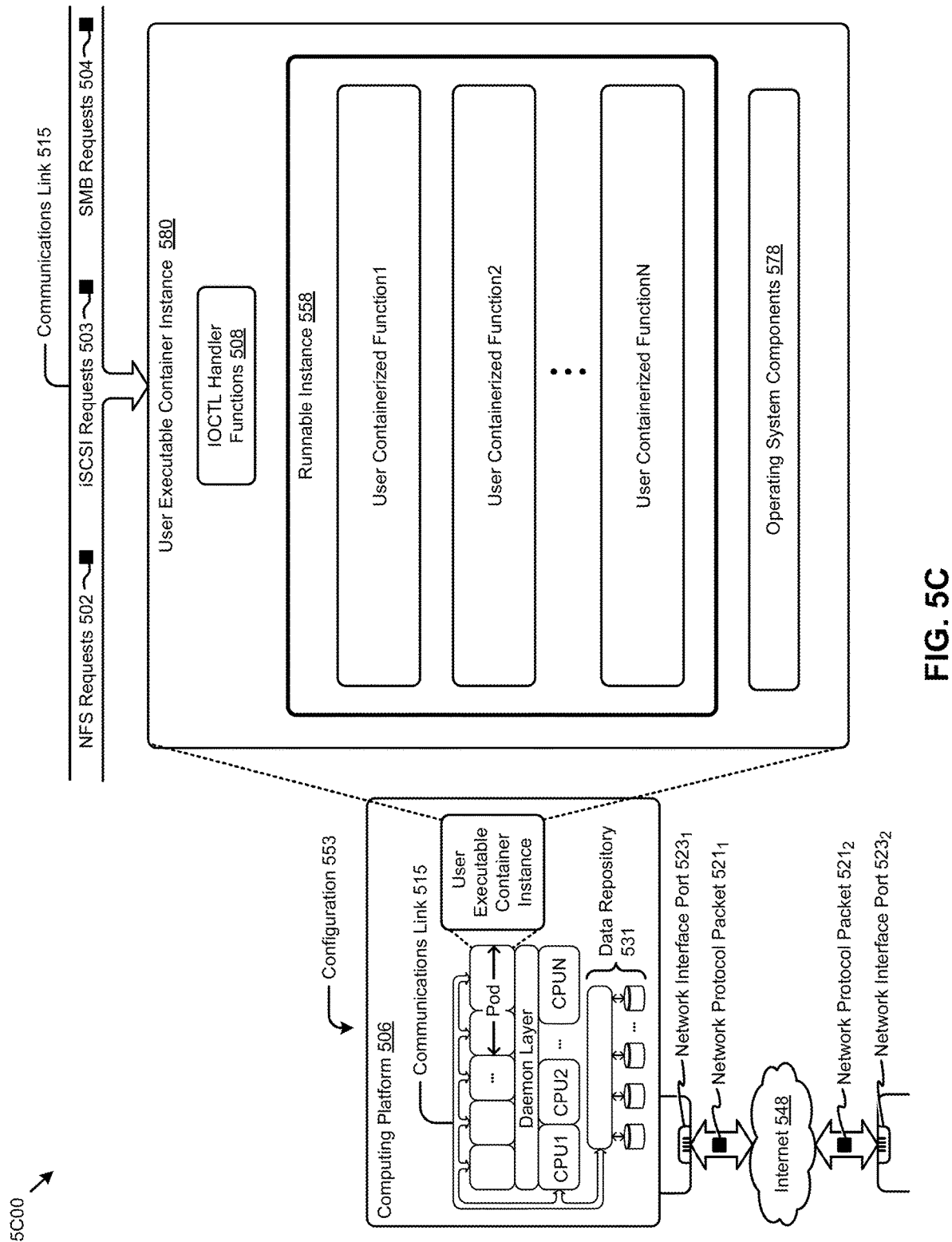

FIG. 5C depicts a virtualized controller implemented by a daemon-assisted containerized architecture 5C00. The containerized architecture comprises a collection of interconnected components suitable for implementing embodiments of the present disclosure and/or for use in the herein-described environments. Moreover, the shown daemon-assisted containerized architecture includes a user executable container instance in configuration 553 that is further described as pertaining to user executable container instance 580. Configuration 553 includes a daemon layer (as shown) that performs certain functions of an operating system.

User executable container instance 580 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 558). In some cases, the shown operating system components 578 comprise portions of an operating system, which portions are interfaced with or included in the runnable instance and/or any user containerized functions. In this embodiment of a daemon-assisted containerized architecture, the computing platform 506 might or might not host operating system components other than operating system components 578. More specifically, the shown daemon might or might not host operating system components other than operating system components 578 of user executable container instance 580.

The virtual machine architecture 5A00 of FIG. 5A and/or the containerized architecture 5B00 of FIG. 5B and/or the daemon-assisted containerized architecture 5C00 of FIG. 5C can be used in any combination to implement a distributed platform that contains multiple servers and/or nodes that manage multiple tiers of storage where the tiers of storage might be formed using the shown data repository 531 and/or any forms of network accessible storage. As such, the multiple tiers of storage may include storage that is accessible over communications link 515. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combination of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs, RAPMs, hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 551 of FIG. 5A) to manage the interactions between the underlying hardware and user virtual machines or containers that run client software.

Distinct from user virtual machines or user executable containers, a special controller virtual machine (e.g., as depicted by controller virtual machine instance 530) or a special controller executable container is used to manage certain storage and I/O activities. Such a special controller virtual machine is referred to as a service virtual machine (CVM) or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method in a computing cluster having a plurality of computing nodes distributed within two or more hierarchical availability domains:
    receiving a replication factor requirement for a computing entity in the computing cluster, the replication factor requirement comprising an integer of at least two and indicating a number of copies of the computing entity to be replicated in the computing cluster;
    receiving a target hierarchical availability domain level, the target hierarchical availability domain level indicating a particular level of the hierarchical availability domains;
    forming a multi-level sort order for the plurality of computing nodes that are in the target hierarchical availability domain level and also in a hierarchically lower availability domain level; and
    mapping a computing entity to the computing cluster to satisfy the replication factor requirement, wherein the computing entity is mapped according to the multi-level sort order.

2. The method of claim 1, wherein the mapping of the computing entity onto the plurality of computing nodes achieves the replication factor requirement at the target hierarchical availability domain level and at the hierarchically lower availability domain level.

3. The method of claim 1, wherein the mapping of the computing entity onto the plurality of computing nodes achieves the replication factor requirement at a further level that is lower than the hierarchically lower availability domain level.

4. The method of claim 1, wherein the replication factor requirement comprises a number of replicas of the computing entity.

5. The method of claim 4, wherein the number of replicas of the computing entity are distributed across at least two different ones of the hierarchical availability domains.

6. The method of claim 1, wherein at least one computing entity corresponds to a ring node that comprise metadata.

7. The method of claim 1, wherein at least one computing entity corresponds to a replicated data extent.

8. The method of claim 1, wherein at least one computing entity corresponds to a server.

9. The method of claim 1, wherein a first node of the target hierarchical availability domain is connected to a first power supply and a second node of the hierarchically lower availability domain is connected to a second power supply, and wherein the first power supply and the second power supply are different.

10. The method of claim 1, further comprising, detecting a failure event that affects at least one of the nodes from within one of the hierarchical availability domains.

11. The method of claim 1, wherein the target hierarchical availability domain level is at least one of, a site level, a rack level, or a block level.

12. The method of claim 1, wherein the multi-level sort order is formed by forming a first level sort key based on a first number of nodes in the target hierarchical availability domain level, and by forming a second level sort key based on a second number of nodes in the hierarchically lower availability domain level.

13. A non-transitory computer readable medium having stored thereon a sequence of instructions which, when stored in memory and executed by one or more processors causes the one or more processors to perform a set of acts in a computing cluster having a plurality of computing nodes distributed within two or more hierarchical availability domains, the set of acts comprising:
    receiving a replication factor requirement for a computing entity in the computing cluster, the replication factor requirement comprising an integer of at least two and indicating a number of copies of the computing entity to be replicated in the computing cluster;
    receiving a target hierarchical availability domain level, the target hierarchical availability domain level indicating a particular level of the hierarchical availability domains;
    forming a multi-level sort order for the plurality of computing nodes that are in the target hierarchical availability domain level and also in a hierarchically lower availability domain level; and
    mapping a computing entity to the computing cluster to satisfy the replication factor requirement, wherein the computing entity is mapped according to the multi-level sort order.

14. The non-transitory computer readable medium of claim 13, wherein the mapping of the computing entity onto the nodes achieves the replication factor requirement at the target hierarchical availability domain level and at the hierarchically lower availability domain level.

15. The non-transitory computer readable medium of claim 13, wherein the mapping of the computing entity onto the nodes achieves the replication factor requirement at a further level that is lower than the hierarchically lower availability domain level.

16. The non-transitory computer readable medium of claim 13, wherein the replication factor requirement comprises a number of replicas of the computing entity.

17. The non-transitory computer readable medium of claim 16, wherein the number of replicas of the computing entity are distributed across at least two different ones of the hierarchical availability domains.

18. The non-transitory computer readable medium of claim 16, wherein at least one computing entity corresponds to a ring node that comprise metadata.

19. A system comprising:
    a storage medium having stored thereon a sequence of instructions; and
    one or more processors that execute the instructions to cause the one or more processors to perform a set of acts in a computing cluster having a plurality of computing nodes distributed within two or more hierarchical availability domains, the set of acts comprising,
        receiving a replication factor requirement for a computing entity in the computing cluster, the replication factor requirement comprising an integer of at least two and indicating a number of copies of the computing entity to be replicated in the computing cluster;
        receiving a target hierarchical availability domain level, the target hierarchical availability domain level indicating a particular level of the hierarchical availability domains;
        forming a multi-level sort order for the plurality of computing nodes that are in the target hierarchical availability domain level and also in a hierarchically lower availability domain level; and
        mapping a computing entity to the computing cluster to satisfy the replication factor requirement, wherein the computing entity is mapped according to the multi-level sort order.

20. The system of claim 19, wherein the mapping of the computing entity onto the nodes achieves the replication factor requirement at the target hierarchical availability domain level and at the hierarchically lower availability domain level.

* * * * *